United States Patent
Chretien

(12) 
(10) Patent No.: US 11,114,960 B2
(45) Date of Patent: Sep. 7, 2021

(54) ELECTRIC DRIVE TRAIN AND METHOD FOR FEEDING AN ELECTRIC DRIVE TRAIN

(71) Applicant: Pascal Chretien, Marseilles (FR)

(72) Inventor: Pascal Chretien, Marseilles (FR)

(*) Notice: Subject to any disclaimer, the term of this patent is extended or adjusted under 35 U.S.C. 154(b) by 0 days.

(21) Appl. No.: 16/605,786

(22) PCT Filed: Apr. 18, 2017

(86) PCT No.: PCT/AU2017/050345
§ 371 (c)(1),
(2) Date: Oct. 16, 2019

(87) PCT Pub. No.: WO2018/191769
PCT Pub. Date: Oct. 25, 2018

(65) Prior Publication Data
US 2020/0127586 A1    Apr. 23, 2020

(51) Int. Cl.
*H02P 5/00* (2016.01)
*H02P 4/00* (2006.01)
(Continued)

(52) U.S. Cl.
CPC ................. *H02P 4/00* (2013.01); *B60K 6/46* (2013.01); *B60L 50/15* (2019.02); *H02K 47/20* (2013.01)

(58) Field of Classification Search
CPC .. H02P 4/00; H02P 25/22; H02P 27/16; B60L 50/15; B60L 15/007;
(Continued)

(56) References Cited

U.S. PATENT DOCUMENTS 8,026,679 B2    9/2011  Seo et al.
2007/0296359 A1* 12/2007  Seo .......................... H02P 27/16
                                                        318/139
(Continued)

FOREIGN PATENT DOCUMENTS

| CN | 1978239 A | 6/2007 |
|---|---|---|
| EP | 2854284 A2 | 4/2015 |
| WO | 2018/191769 A1 | 10/2018 |

OTHER PUBLICATIONS

Supplementary European Search Report dated Oct. 13, 2020, for related Application No. EP17906631.1.
(Continued)

*Primary Examiner* — Muhammad S Islam
(74) *Attorney, Agent, or Firm* — Burns & Levinson, LLP; Joseph M. Maraia

(57) ABSTRACT

The present invention discloses an electric drive train comprising:—a rotor or propeller shaft (R),—an electric motor assembly (GEMD) configured to drive the rotor or propeller shaft (R), the electric motor assembly (GEMD) comprising a plurality of stacked electric motor elements (Ee1, Ee2, Ee3, Ee4),—a power branch of a first topology feeding a stacked electric motor element (Ee1) of the electric motor assembly (GEMD), said power branch (b1) comprising a RESS and an electric generator (G) supplying a power signal to said power branch (b1),—a power branch (b3) of a second topology dissimilar from the first topology, said power branch feeding another stacked electric motor element of the electric motor assembly (GEMD), said power branch (b3) comprising: # an electric generator (G) supplying a power signal to said power branch, a matrix converter (Mc3) feeding the another stacked electric motor element (Ee3), # or, an electric generator supplying Direct Current to said
(Continued)

power branch and a motor controller feeding the second stacked electric motor element (Ee3).

20 Claims, 11 Drawing Sheets

(51) Int. Cl.
*B60L 50/15* (2019.01)
*B60K 6/46* (2007.10)
*H02K 47/20* (2006.01)

(58) Field of Classification Search
CPC ............ B60L 15/2036; B60L 2200/10; B60L 2220/54; B60L 3/0092; H02K 47/20; B60K 6/46
See application file for complete search history.

(56) References Cited

U.S. PATENT DOCUMENTS

| 2013/0200691 | A1  | 8/2013 | Crane et al. |
| 2014/0248168 | A1* | 9/2014 | Chantriaux ............ B64C 27/14 |
| | | | 417/410.1 |
| 2016/0046193 | A1  | 2/2016 | Park |
| 2016/0176534 | A1* | 6/2016 | Himmelmann ........ B64D 27/24 |
| | | | 290/45 |

OTHER PUBLICATIONS

Sangshin Kwak et al: "Phase-Redundant-Based Reliable Direct AC/AC Converter Drive for Series Hybrid Off-Highway Heavy Electric Vehicles",IEEE Transactions on Vehicular Technology, vol. 59, No. 6, May 20, 2010 (May 20, 2010), pp. 2674-2688, XP055540000, US.

* cited by examiner

ELECTRIC DRIVE TRAIN AND METHOD FOR FEEDING AN ELECTRIC DRIVE TRAIN

CROSS REFERENCE TO RELATED APPLICATIONS

This application is a United States national phase application under 35 U.S.C. 371 of co-pending International Patent Application Number PCT/AU2017/050345, filed on Apr. 18, 2017, the disclosure of which is incorporated herein by reference in its entirety for all purposes.

TECHNICAL FIELD OF THE INVENTION

The present invention discloses an electric drive train and a method for feeding an electric drive train. More specifically, the present invention discloses a series-hybrid electric drive train architecture or an electric drive train architecture capable of improving end to end efficiency, yet maintaining performance and safety advantages inherent to this topology.

This invention primarily applies to the field of aircraft propulsion, however it can be extended to other domains such as terrestrial propulsion (automotive, motorbikes, motorcycles, armored vehicles such as tanks, . . . ), marine propulsion (boat, jet-ski, torpedo, submarine, . . . ), as well as some power generation (e.g. wind generators and hydroelectric generators).

BACKGROUND

Conventional series-hybrid electric drive train transmissions as depicted in FIG. 1 are commonly based on linear architectures involving a string of sub-systems where a gas turbine or an internal combustion engine T drives an electric generator assembly G in order to produce Alternating Current (AC). This AC is subsequently rectified by active or passive rectifier units' Ru in order to produce Direct Current (DC). Other technologies than gas turbine or piston engines can be used to produce DC, such as fuel cell, magnetohydrodynamic generator, thermoelectric generator, radio isotopic generator or beta cells. DC is usually carried by a main bus, B that feeds the electric drive units Cont1/M/R and Cont2/T/R as well as, when applicable, an energy storage device or a Rechargeable Energy Storage System, RESS. A bidirectional DC/DC converter (if required) adapts the main bus B voltage to the RESS voltage. A power management system, PM, comprising an engine management device and a power control unit, adjusts the gas turbine, or internal combustion engine T fuel flow and regulates electrical power with regards to the demand. The left section of the electric drive train depicted on FIG. 1, (comprising the gas turbine or internal combustion engine T, electric generator assembly G, rectifier units, Ru, main bus B, DC/DC converter, RESS and power management system PM) constitutes the backend section of the electric drive train. The front-end section of the electric drive train, depicted on the right of FIG. 1, comprises two electric motor assemblies M/R and T/R and their associated redundant controllers Cont1, Cont2. Those controllers convert the DC into the AC waveform necessary to drive the electric motor assemblies' M/R and T/R. Referring to helicopters, one electric motor assembly, M/R (on the top) is dedicated to driving the main rotor, R and the accessories ACC such as hydraulic pumps, cooling pumps etc. . . . whereas the other electric motor assembly T/R (on the bottom) drives the tail rotor Tr. The tail rotor controller Cont2 may be directly connected to the RESS in order to maintain yaw control during autorotation, in the case of a turbine failure.

The energy stored into the RESS can be combined with the energy produced by the electric generator assembly G during flight phases requiring high power demand (such as takeoff and climb), resulting in appreciable downsizing of the gas turbine or internal combustion engine T. Additionally, the RESS provides a valuable failure backup in case of electric generator assembly G, or engine T failure, resulting in a considerably safer operation than conventional mechanical drive trains. The potential of series-hybrid topologies in aviation is considerable, considering the significant gains in safety and performance.

A multi-stack topology is disclosed by the same inventor, Pascal Chretien, in the patent documents FR2957207, US2014248168, and US2014203739. Those three patents disclose (at system level) an electromagnetic distributed direct drive used in replacement of mechanical gearboxes. In addition to their improved resilience to fatigue, when compared with conventional mechanical gearboxes, the inherent performance and safety advantages brought by those multi-stack systems capable of eliminating single point of failure are detailed in those three patents documents.

The aforementioned patent documents FR2957207, US2014248168, and US2014203739 also detail the laws governing power distribution across the different stacked electric motor elements constituting the electromagnetic transmission, in view of optimizing weight budget. Although series-hybrid architectures are mentioned, those patent documents do not cover end-to-end efficiency, nor do they disclose any particular architecture or solution capable of improving system efficiency.

FIG. 2 is a block diagram depicting conventional series-hybrid electric drive train architecture adapted to a notional four stack electric drive train as disclosed by aforementioned patent documents FR2957207, US2014248168, and US2014203739. Only the main rotor drive-train is depicted in this FIG. 2, for sake of simplicity (the tail rotor being a scale model of the main rotor drive, as tail rotors only need to develop a fraction of the power produced by the main rotor). Moreover, the power management system is not depicted in this FIG. 2 for sake of simplicity, also. A gas turbine or internal combustion engine T drives a multi-stack electric generator assembly G. Said electric generator assembly G comprises four independent stacked electric generator elements Eg1, Eg2, Eg3, Eg4. Each stacked electric generator elements Eg1, Eg2, Eg3, Eg4 is connected to its own associated rectifier Ru1, Ru2, Ru3, Ru4 subsequently producing DC that is fed to the main bus B. The RESS used for transient power demand and emergency backup (engine failure) is connected to the main bus B. The main bus B drives a controller assembly via separate outputs. The controller assembly comprises a plurality of physically distinct motor controllers Cont1, Cont2, Cont3, Cont4. Those controllers convert the DC into AC waveforms, each one feeding one stacked electric motor element Ee1, Ee2, Ee3, Ee4 of the electric motor assembly GEMD (as disclosed by aforementioned patent documents FR2957207, US2014248168, and US2014203739), said stacked electric motor elements being connected to the propeller shaft or main rotor R. This solution brings some advantages over the architecture depicted in FIG. 1, as it eliminates most single points of failure, resulting in better end to end reliability (MTBF). The failure of one or several components in the chain will result in lower available power. However, it may not necessitate an emergency landing.

Series-hybrid topologies present numerous advantages over mechanical drives; one of them being the capacity of operating as a transmission with infinitely variable reduction ratio, enabling to operate the engine (or gas turbine) at its most thermodynamically efficient point. Another advantage is the modularity and ease of physical integration: all the components of a series-hybrid drive being interconnected by electrical cables, they can be freely moved across the vehicle without negatively impacting on overall system complexity, as opposed to mechanical drive trains suffering from constraints inherent to shaft, gears and other mechanical parts.

However, one of the downsides of series-hybrid electric drive trains is their non-negligible end-to-end losses (loss between the generator's input shaft and the rotor or propeller shaft), resulting from the cumulated losses introduced by each component. The end-to-end loss introduced by topologies such as depicted in FIG. 1 and FIG. 2 is the sum of the losses introduced by:

The electric generator assembly G ($\approx$2% to 3% loss)
The rectifier unit Ru ($\approx$2% to 3% loss)
The main bus B ($\approx$1% loss)
The DC/DC converter (if any)$\approx$3%
The redundant controller Cont1, Cont2 ($\approx$3% to 4% loss)
The electric motor assemblies M/R, T/R, GEMD ($\approx$3% to 4% loss).

In practice, end-to-end losses of a conventional series-hybrid electric drive train such as depicted in FIG. 1 and FIG. 2, can range from 11% to 13%. The direct consequence of those losses is a potentially higher energy requirement (fuel consumption), than a conventional mechanical drive. Over the entire service life of the aircraft, those losses may represent considerable amounts of fuel. Running the internal combustion engine or gas turbine T at its most thermodynamically efficient operating point during cruise is known to potentially offset some of those losses. However, real life efficiency improvements are often marginal when compared with modern mechanical drive trains. This efficiency pitfall is a known limitation in aviation where weight and energy efficiency are both paramount.

Series-hybrid drive trains such as depicted in FIG. 1 and FIG. 2 suffer from constant end-to-end losses, regardless of the power output or flight domain; however fixed wing or rotary wing aircrafts must operate over a broad range of power to cover the whole flight envelope. Consequently, there is a need for a novel electric drive train architecture enabling lower end-to-end losses during cruise, which is where aircraft spend most of their operational time.

Referring to twin engine aircrafts, conventional twin engine configurations suffer from several drawbacks. Conventional twin engine helicopters benefit from statistically significantly decreased likelihood of total power loss, however, both engines are connected to one single mechanical gearbox which cannot be duplicated for redundancy, hence remaining a known single point of failure. The failure of one gear belonging to the mechanical drive train leads to a total transmission loss. This fact is illustrated by regular crash reports issued by civil aviation authorities worldwide. Another drawback of the conventional twin engine configuration, is the fact that each turbine must be sized in such a way to be capable of sustaining a flight in OEI (One Engine Inoperative) condition. This condition must be met to take into consideration the remote possibility of OEI, when in fact most of the aircraft's operational life is conducted using two serviceable engines. In normal operation, each engine is continuously operating at 50% to 70% of its emergency power.

FIG. 6 depicts the heat rate (which relates to specific fuel consumption) of a notional gas turbine versus its output power. FIG. 6 teaches us that the lower the power developed by a gas turbine is, the higher its Specific Fuel Consumption becomes. Therefore, there is a clear advantage to operate the gas turbine at its highest possible power to benefit from optimal fuel consumption. Consequently, twin turbine aircraft are less fuel efficient than singles. Analyzing a twin engine power plant at system level reveals that specific power per unit of weight is lower than in a single engine machine, which negatively impacts the payload. Another problem affecting a conventional twin engine aircraft, is that two identical turbines must be used, both of which have identical TBO (Time Before Overall) resulting in longer downtime for maintenance and almost a double operating cost. Given this situation, a further aim of the invention is to significantly reduce the physical size and operating costs of electric drive train.

Transient response is another inherent problem of conventional twin engine solution: when one engine fails, the remaining valid gas turbine that was running at 50% to 70% of its maximum power must increase its power output as quickly as possible in order to compensate for the failed engine. Depending on the Density Altitude, transient power requirement can be difficult to meet without adverse effect, such as possible compressor stall. Conventional turbine can take up to a few seconds to reach their maximum power, hence negatively affecting aircraft's safety and flight envelope. This drawback is particularly preponderant during takeoff: Engine failure during takeoff affects the takeoff profile path and specific takeoff procedures are elaborated for OEI condition. Another context where transient engine response during OEI entry can become potentially dangerous is when one engine fails during sling work operation (hover out of ground effect), causing the helicopter to momentarily sink. If a rescuer is on the sling, the situation can become hazardous. Given this situation, another aim of the invention is to improve the safety of electric drive train.

In general, it would be desirable to have an electric drive and a method for feeding an electric drive train that addresses at least some of the above disadvantages, as well as improving flight envelope, hence mission profiles.

SUMMARY OF THE INVENTION

In accordance with a first aspect of the present invention, there is provided an electric drive train comprising:
  a rotor or propeller shaft,
  an electric motor assembly configured to drive the rotor or propeller shaft, the electric motor assembly comprising a plurality of stacked electric motor elements,
  a power branch of a first topology feeding a stacked electric motor element of the electric motor assembly, said power branch comprising an electric generator supplying electric current to said power branch and a rechargeable energy storage system (RESS),
  a power branch of a second topology dissimilar from the first topology, said power branch feeding another stacked electric motor element of the electric motor assembly, said power branch comprising:
    an electric generator supplying Alternating Current to said power branch, and a matrix converter feeding the another stacked electric motor element.
    or, an electric generator supplying Direct Current to said power branch, and a motor controller feeding the second stacked electric motor element.

The disclosed invention intends solving the problems related to the prior art. Moreover, this novel architecture is capable of improving end to end efficiency at power settings commonly applied during significant parts of aircraft's mission profiles (such as during cruise, which usually accounts for most of the fuel consumption), or other propulsion systems as well as electric power generation device belonging to the domains previously mentioned in the technical field of the invention. Each stacked electric motor element can be independently supplied by different routes hereinafter defined as power branches, b1 to bn. By optimizing the topology of each power branch to the power setting corresponding to a given flight domain, significant efficiency improvements can be obtained and new mission profiles are made possible. The disclosed architectures combine two different topologies of power branches, thus optimizing efficiency during cruise, as well as maintaining transient power capability, such as during takeoff or aerial work operations (e.g. sling work), or power backup during emergencies.

FIG. 4 shows the power requirement versus the speed of a medium size notional helicopter in the 1.7 ton range, at three different takeoff weights. FIG. 5 shows the power requirement versus the speed of a notional light fix wing aircraft. Although referring to two significantly different types of aircrafts, those two graphs are noticeable in that the overall trends are very similar, starting with a high power demand at low speed, where the angle of attack of rotor blades or wings is high. As the speed increases, the associated power demand decreases to a minimum (this minimum of power demand corresponds to the airspeed of maximum endurance, or longest time in the air). Another noticeable point is Best Range Airspeed that can be found where the tangent to the origin meets the power curve. Practically, Best Range Airspeed is higher than the maximum endurance airspeed. Taking FIG. 4 as an example and considering a helicopter with a takeoff weight of 1100 Kg (curve n° 3), it can be found that maximum endurance speed is in the vicinity of 50 Knots (kt) and will require about 99 kW, whereas the best range speed is about 85 Knots (kt) and will require 125 kW. Economical cruise speed will therefore be in the vicinity of 85 Knots, and optimizing the system efficiency in the 125 kW range would result in significant energy savings during the whole service life of the helicopter. Increasing the airspeed further results in higher power demand in order to overcome parasitic drag created by the fuselage, landing gear, rotor head and other components exposed in the slipstream.

According to a series-hybrid architecture, the electric generator which supplies current to the power branch of the first topology is the same electric generator which supplies Alternating Current to the power branch of the second topology, said electric generator is in the form of an electric generator assembly supplying Alternating Current to both power branch of the first topology and power branch of the second topology. Said electric generator assembly comprises a plurality of stacked electric generator elements:
  a stacked electric generator element supplies Alternating Current to the power branch of the first topology;
  and a second stacked electric generator element supplies Alternating Current to the power branch of the second topology.

According to a different embodiment of the invention, the electric generator which supplies current to the power branch of the first topology may be physically distinct from the electric generator which supplies Alternating Current to the power branch of the second topology.

Further, the electric generator which supplies Alternating Current to the power branch of the second topology can be an electric generator assembly comprising a plurality of stacked electric generator elements and at least one stacked electric generator element can supply Alternating Current to the power branch of the second topology.

The electric generator which supplies current to the power branch of the first topology can be an electric generator assembly comprising a plurality of stacked electric generator elements and at least one stacked electric generator element can supply Alternating Current to the power branch of the first topology.

The power branch of the first topology and the power branch of the second topology may be cross connected at generator level.

According to yet another embodiment of the invention, the power branch of the first topology is supplied with Direct Current by the electric generator.

Preferentially, the power branch of the first topology comprises a rechargeable energy storage system (RESS) configured to enable an electric flight during some phases of a flight domain as well as being capable of meeting a transient power demands or emergency power demands.

A second aspect of the invention provides an aircraft with an electric drive train comprising:
  a rotor or propeller shaft,
  an electric motor assembly configured to drive the rotor or propeller shaft, the electric motor assembly comprising a plurality of stacked electric motor elements,
  a power branch of a first topology feeding a stacked electric motor element of the electric motor assembly, said power branch comprising an electric generator supplying electric current to said power branch and a RESS,
  a power branch of a second topology dissimilar from the first topology, said power branch feeding another stacked electric motor element of the electric motor assembly, said power branch comprising:
    an electric generator supplying Alternating Current to said power branch, and a matrix converter feeding the another stacked electric motor element.
    or, an electric generator supplying Direct Current to said power branch, and a motor controller feeding the second stacked electric motor element.

A third aspect of the invention provides a method for feeding an electric drive train comprising an electric motor assembly configured to drive a rotor or propeller shaft, said electric motor assembly comprising a plurality of stacked electric motor elements, the method comprising the steps of:
  feeding a stacked electric motor element of the electric motor assembly by a power branch of a first topology comprising an electric generator supplying electric current to said power branch and a RESS,
  feeding another stacked electric motor element of the electric motor assembly by a power branch of a second topology dissimilar from the first topology said power branch comprising:
    an electric generator supplying Alternating Current to said power branch, and a matrix converter feeding the another stacked electric motor element.
    or, an electric generator supplying Direct Current to said power branch, and a motor controller feeding the second stacked electric motor element.

This method may also comprise the step of adjusting the energy distribution carried by each power branch in function of a flight domain.

This method may also comprise the step of cross connected the power branches with electrical cross connection at generator level.

A fourth aspect of the present invention provides an electric drive train including:
one or more power sources collectively providing at least two power signals;
an electric motor assembly including a plurality of electric motor elements;
a power distribution system for distributing electric power from the one or more power sources to the electric motor assembly, the power distribution system including a plurality of power supply branches with each branch configured to transmit a power signal from the one or more power sources to at least one of the electric motor elements, wherein;
a first subset of the power supply branches being configured to power a first subset of the electric motor elements with a first subset of the power signals, the first subset of power supply branches including one or more motor controllers feeding the first subset of electric motor elements and a rechargeable energy storage system configured to store energy of the first subset of power signals as stored energy, and to selectively supply the stored energy to the one or more motor controllers to feed the first subset of electric motor elements; and
a second subset of the power supply branches being configured to power a second subset of the electric motor elements with a second subset of the power signals, the second subset of the power supply branches including one or more matrix converters operating in AC-AC mode to modify the second subset of the power signals to provide modified power signals to a second subset of the electric motor elements.

In some embodiments, each electric motor element includes a dedicated power supply branch.

In some embodiments, the one or more power sources includes a plurality of electric generator elements. In some of these embodiments, each power supply branch is connected to a corresponding electric generator element. In others of these embodiments, at least one of the power supply branches is connected to two or more electric generator elements.

In some embodiments, a first subset of the plurality of electric generator elements are stacked together to define a stacked generator assembly and wherein the stacked generator assembly includes a first alternating current (AC) source. In some embodiments, a second subset of the plurality of electric generator elements are stacked together to define a second stacked generator assembly and wherein the second stacked generator assembly includes a second AC source. The system driving the first and/or second AC generator unit/s may include one or more of a Free Piston Engine, internal combustion engine or gas turbine. That is, the first and/or second AC source includes one or more of a Free Piston Engine, internal combustion engine or gas turbine.

In some embodiments, a subset of the electric generator elements are Direct Current (DC) power generators.

In some embodiments, the rechargeable energy storage system is configured to supply power during times of dynamic power demands of a connected load.

In some embodiments, the one or more power sources has a power production capacity and wherein the rechargeable energy storage system is configured to supply additional power during times when the dynamic power demands exceed the power production capacity of the one or more power sources.

In some embodiments, the rechargeable energy storage system is configured to supply power during times of power supply failure.

In some embodiments, the one or more matrix converters modify one or more of a frequency, shape, or duty cycle of the second subset of power signals.

In some particular embodiments, the electric drive train includes two or more power sources. In some of these embodiments, at least one of the power sources supplies power to at least one power supply branch of both the first and second subsets.

In some embodiments, the plurality of electric motor elements are stacked together to define a stacked electric motor assembly.

In some embodiments, the second subset of power branch distributes a majority of power from the one or more power sources to the electric motor elements when power demands fall within a predetermined power range.

In accordance with a fifth aspect of the present invention, there is provided an aircraft having a rotor or propeller shaft and an electric drive train according to any one of the preceding claims, wherein the rotor or propeller shaft are driven by the plurality of stacked electric motor elements.

In some embodiments, the first subset of power supply branches exclusively distributes power to the electric motors elements during any part of the flight domain and during power source failure of the aircraft.

In some embodiments, a distribution of power carried by each subset of the power supply branches is a function of a flight domain.

In accordance with a sixth aspect of the present invention, there is provided a method of distributing power from one or more power sources to an electric motor assembly, the electric motor assembly including a plurality of stacked electric motor elements, the method including:
(i) defining first and second power supply paths for respectively transmitting first and second power signals between the one or more power sources and the electric motor assembly, wherein:
the first power supply path including one or more motor controllers feeding a first subset of the electric motor elements and a rechargeable energy storage system configured to store energy of the first power signal as stored energy, and to selectively supply the stored energy to the one or more motor controllers to feed at least one of electric motor elements; and
the second power supply path including a matrix converter system operating in AC-AC mode configured to modify the second power signal to provide a modified second power signal to at least one of the electric motor elements; and
(ii) selectively distributing electric power from the one or more power sources to the electric motor assembly via the first and second power supply paths.

In some embodiments, step (ii) includes selectively adjusting the distribution of power transmitted along each path based on operating demands of the electric motor assembly.

In accordance with a seventh aspect of the present invention, there is provided a method of feeding an electric drive train according to the fourth aspect, the method including the steps of:
(i) determining-operational demands of a load connected to the motor assembly; and (ii) selectively adjusting the distribution of power transmitted along first and second subsets of the power supply branches based on the operational demands of the load.

DESCRIPTION OF THE FIGURES

A more complete understanding of the embodiments of the present disclosure may be derived by referring to the detailed specification and claims when considered in conjunction with the following figures, wherein like reference refer to similar elements throughout the figures. The figures are provided to facilitate understanding of the disclosure without limiting the breadth, scope, scale, or applicability of the disclosure. The drawings are not necessarily made to scale:

EMBODIMENTS OF THE INVENTION

The following detailed specification is exemplary in nature and is not intended to limit the disclosure or the application and uses of the embodiments of the disclosure. Descriptions of specific devices, techniques, and applications are provided only as examples. As would be apparent to one of ordinary skill in the art after reading this specification, the following are examples and embodiments of the disclosure and are not limited to operating in accordance with these examples. Other embodiments may be used and structural changes may be made without departing from the scope of the exemplary embodiments of the present disclosure.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components specifically related to gas turbine or internal combustion engines, free piston engine, electric generators, rectifiers, converters, main bus, power management system, DC/DC converter, Rechargeable Energy Storage System RESS, controller assembly, controllers, rotor or propeller shaft and electric motors, may not be described in detail herein, the specification being limited to system level. In addition, those skilled in the art will appreciate that embodiments of the present disclosure may be practiced in conjunction with a variety of structural bodies, and that the embodiments described herein are merely example embodiments of the disclosure.

Figure 3:
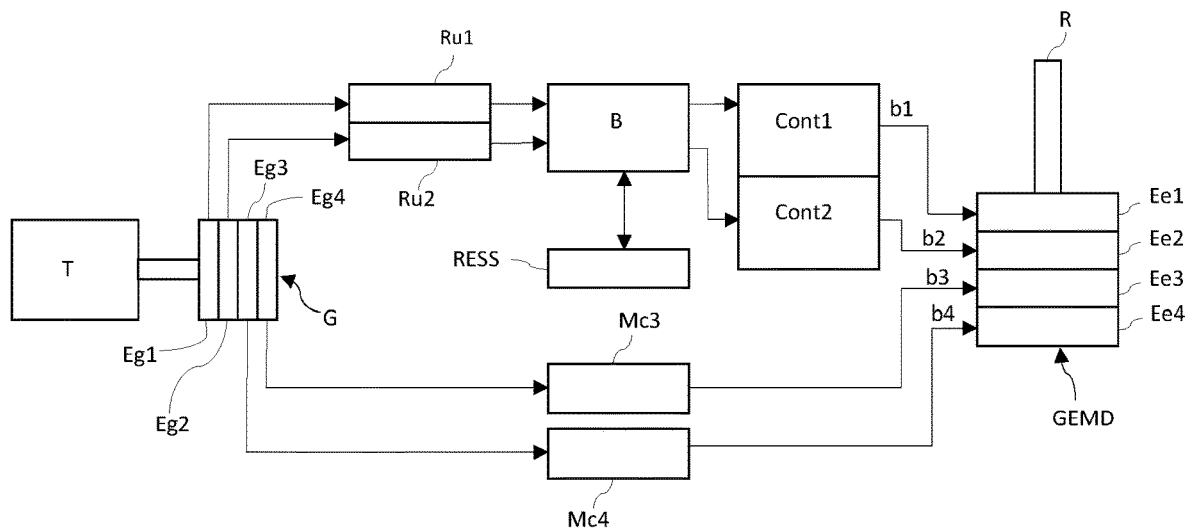
FIG. 3 is a block diagram depicting a series-hybrid electric drive train architecture according to the invention in accordance with an illustrative embodiment.

First Embodiment—FIG. 3

Figure 2:
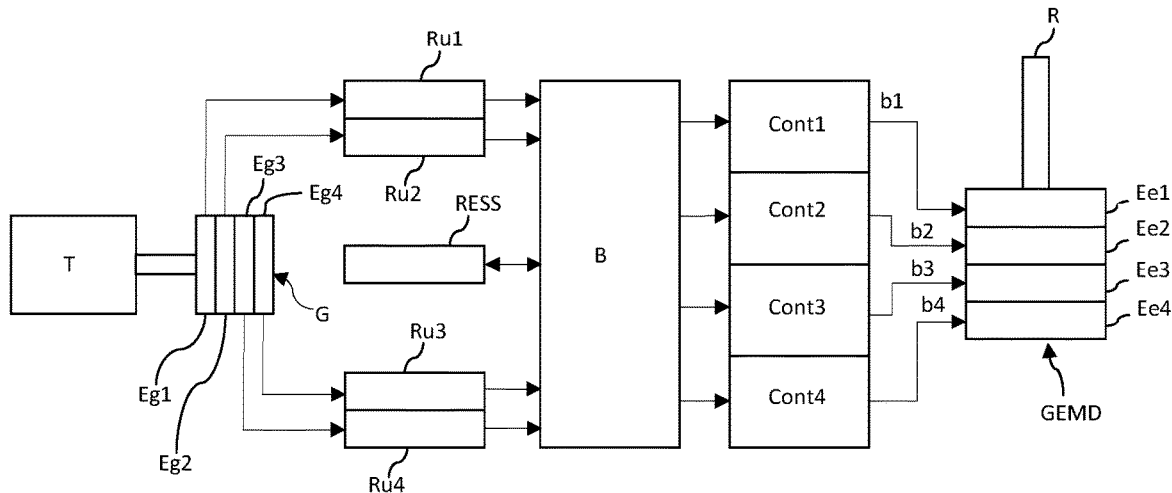
FIG. 2 is a block diagram depicting conventional series-hybrid electric drive train architecture adapted to a notional four-stack electric motor.

FIG. 3 presents a series-hybrid electric drive train architecture in accordance with an illustrative embodiment of the invention where a single engine T is used to power the notional four-stack electric motor assembly hereinafter referred as GEMD. This disclosed architecture uses the same multi-stack electric motor assembly GEMD and multi-stack electric generator assembly G as depicted in FIG. 2. The combination of the engine T and generator assembly G collectively represents a power source for the electric drive train.

A single engine T is used to power the electric motor assembly GEMD. In the electric drive train depicted in FIG. 3, a symmetrical four stack topology is used. It comprises the four stack electric generator assembly G as well as the four stack motor assembly GEMD.

A notable feature of multi stack architectures is that each motor element constituting the stack can be independently supplied by its dedicated controller assembly. Different topologies can be used:

Motor controllers and associated electronics can be physically located outside the motor element, in what is referred to as a "split system" (the most common architecture used by many conventional electric drives).

Power switching circuitry can be integrated inside the motor elements, and supervised by an external management unit.

Another type of topology involves a plurality of power modules integrated inside the various motor elements, in which each power module comprises its own power switching circuitry and microcontrollers capable of autonomous processing and management. Interconnecting a plurality of power modules into a network topology enables distributed processing that brings significant operational and safety advantages by removing all single points of failure. Such topology is disclosed by the same inventor, Pascal Chretien in PCT Patent Application Publication WO2016030168.

Each stacked electric motor element Ee1, Ee2, Ee3 and Ee4 of the electric motor assembly GEMD can be independently supplied by different routes or paths hereinafter defined as "power branches" or "power supply branches", labelled as b1, b2, b3, b4. A power branch is defined by electrical connections and subsystems between a power source and the motor assembly. The power source (engine T and notional generator assembly G) generates four respective power signals for transmission along each of the four power branches.

By optimizing the topology of each power branch to the power setting corresponding to a given flight domain within the aircraft's mission profile, significant efficiency improvements can be obtained. The disclosed architectures combine two different topologies of power branches, enabling optimized efficiency during cruise, as well as maintaining transient power capability, such as during takeoff or aerial work operations (e.g. sling work). The total power delivered to the common shaft R by the whole assembly of motor elements Ee1, Ee2, Ee3 and Ee4 is the sum of the powers delivered by each power branch to its associated motor element (not taking into account energy losses in the motor Elements). The balancing process of the power delivered by each branch can be linear and proportional to the power demand, or it can be in the form of a discrete switching process between one branch to another branch, depending on the type of operation or flight domain. The disclosed architecture maintains the advantages specific to series-hybrid topologies, the battery bank RESS being capable of supplying energy during transient power demands, as well as providing backup in the case of engine failure.

The electric motor assembly GEMD drives a rotor or a propeller shaft R in rotation. The rotor could be the main rotor or the tail rotor of a rotary wing aircraft. Conversely the propeller shaft R could be that of a fix wing aircraft, a car, a motorbike, motorcycle, an armored vehicle or could drive the propeller of a boat, jet-ski, torpedo, submarine, etc.

The electric generator assembly G and the electric motor assembly GEMD are disclosed by patent documents FR2957207, US2014248168, US2014203739 and WO2016030168 which are hereby enclosed for reference. The common electric generator assembly G comprises a plurality (four in the example) of stacked electric generator elements Eg1, Eeg2, Eg3 and Eg4. And the electric motor assembly GEMD also comprises a plurality (four in the example) of stacked electric motor elements Ee1, Ee2, Ee3 and Ee4.

Each of the stacked generator elements Eg1, Eeg2, Eg3 and Eg4, is a single or polyphase AC generator. For example, each of the stacked generator elements Eg1, Eg2, Eg3 and Eg4 could be a three-phase AC generator. Each stacked electric generator element Eg1, Eg2, Eg3, Eg4 of the electric generator assembly G comprises a rotor driven by the common shaft and a stator composed of windings and magnetic circuits.

Also, each stacked electric motor element Ee1, Ee2, Ee3, Ee4 of the electric motor assembly GEMD comprises a rotor driving the common(s) shaft(s) R and a stator composed of windings and magnetic circuits. Each stacked electric motor element Ee1, Ee2, Ee3, Ee4, and each stacked electric generator element Eg1, Eg2, Eg3, Eg4, is mechanically isolated from the adjacent stacks in order to prevent fire and faults propagations.

In FIG. 3, the electric drive train is split into two pairs of power branches:

One pair of power branches b1, b2 (hereinafter "the top power branches") represents a first subset of power branches. These top power branches are connected between two-stack electric generator elements Eg1 and Eg2 of the electric generator assembly G and two-stack electric motor elements Ee1 and Ee2 of the electric motor assembly GEMD. The top power branch b1 feeds the stacked electric motor elements Ee1 and the second top power branch b2, feeds the other stacked electric motor elements Ee2. Those top branches b1, b2, of the first topology, revolve around conventional series-hybrid architecture, as disclosed by FIG. 2.

One pair of power branches b3, b4 (hereinafter "the bottom power branches") represent a second subset of power branches. These lower power branches are connected between the two remaining stacked electric generator elements Eg3 and Eg4 of the electric generator assembly G and the last two-stack electric motor elements Ee3 and Ee4 of the electric motor assembly GEMD. The bottom power branch b3 feeds the stacked electric motor elements Ee3 and the other bottom power branch b4 feeds the other stacked electric motor elements Ee4. Each bottom power branch b3, b4 have a topology dissimilar from the top power branches b1, b2. Those bottom power branches b3 and b4 are based on a second topology dissimilar from the first topology of the top branches b1, b2. This second topology revolving around matrix converters. In this topology, the two-stack electric generator elements Eg3, Eg4 of the electric generator assembly G are directly connected to their own dedicated matrix converter Mc3, Mc4; and each matrix converter Mc3, Mc4 feeds a dedicated electric motor element Ee3, Ee4 of the electric motor assembly GEMD. More specifically, the input of each matrix converter Mc3, Mc4 is connected to the respective stacked electric generator element Eg3, Eg4 of the electric generator assembly G and the output of each matrix converter Mc3, Mc4 is connected to the respective stacked electric motor element Ee3, Ee4 of the electric motor assembly GEMD.

Use of matrix converters has been suggested in relation to supplying power to aircraft. For example, US Patent Application Publication 2009/0256419 entitled "AC/AC Power Converter for Aircraft" utilizes a matrix converter circuit which operates in different modes during different aircraft operating conditions. Similarly, PCT Patent Application Publication WO 2015/116931 describes a matrix converter system providing AC-AC power conversion to achieve high power density for aircraft applications. Such systems do not offer multiple branches of dissimilar topology in a series-hybrid architecture nor include a RESS driving a multi stack of motor elements. Thus, these prior art systems still suffer from the single point of failure deficiencies mentioned in the Background section.

Each top power branch b1, b2 may comprise a rectifier Ru1, Ru2 which is connected between the respective stacked electric generator element Eg1, Eg2 of the electric generator assembly G and the common main bus B. The RESS is connected onto the common main bus B through a direct line, or via a bidirectional DC/DC converter, if required. Each of the top branches b1, b2 also comprises a separate motor controller Cont1, Cont2 independently fed by the main bus B. Each controller Cont1, Cont2 independently feeds one stacked electric motor element Ee1, Ee2 of the electric motor assembly GEMD. Thus, energy is transferred via the two top branches b1, b2, from the two-stack electric generator elements Eg1 and Eg2 of the electric generator assembly G to two-stack electric motor elements Ee1, Ee2 of the electric motor assembly GEMD.

The engine T drives the electric generator assembly G. This engine T can be a gas turbine or an internal combustion engine (such as, but not limiting to turboshaft engine or a piston engine, such as a Free Piston Engine FPE). The stacked electric generator elements Eg1, Eg2, Eg3 and Eg4 of the electric generator assembly G are driven by a common shaft connected to the engine T. The electric generator assembly G is an external unit located outside the engine T. However fully integrated solutions in which the multi-stack electric generator assembly G is integrated inside the engine T are also possible. Such integrated solution presents obvious weight advantages, in the case of a gas turbine, for example, as the multi-stack electric generator assembly G can be driven at high speed directly out of the shaft that has a speed of 40,000 RPM (Rotation Per Minute) or more. Integrating the multi-stack electric generator assembly G inside the gas turbine or internal combustion engine T saves the weight of the primary reduction gearbox which usually comes with all turboshaft engines that have a standard output shaft speed around 6,000 RPM. Moreover, high speed generators bring significant power to weight advantages. Several generator technologies are possible, such as permanent magnets, or switched reluctance. Permanent magnets offer significant weight gains and are often the preferred option. Generator's magnetic topology can be axial flux, radial flux, transverse flux or any other configurations.

Figure 1:
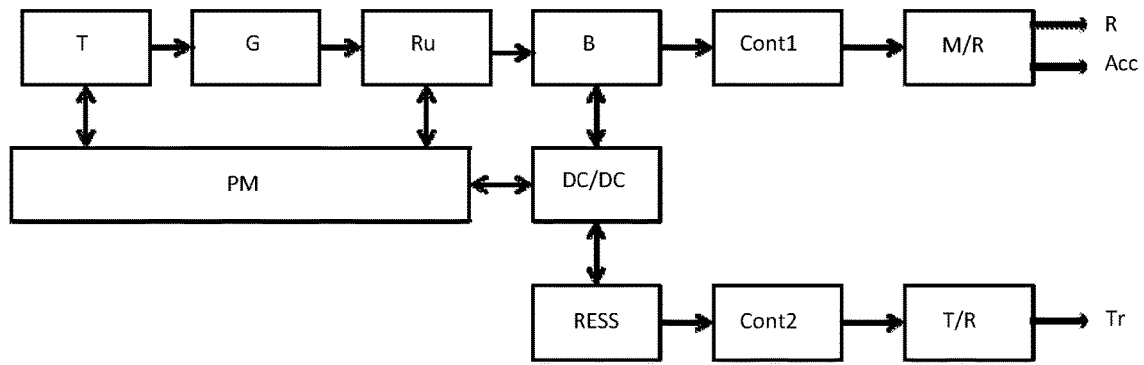
FIG. 1 is a block diagram depicting a conventional series-hybrid electric drive train architecture integrated into a helicopter.

Top Power Branches:

Each top power branch b1, b2 feeds the respective stacked electric motor element Ee1, Ee2 of the electric motor assembly GEMD. The electric generator assembly G supplies current to each top power branches b1 and b2. More specifically, the stacked electric generator elements Eg1 and Eg2 are supplying AC to the top power branches b1 and b2. The AC produced by the stacked electric generator element Eg1 and Eg2 is converted into DC by using the passive or active rectifier unit Ru1 and Ru2 being part of the top power branches b1, b2. Active rectifiers based on thyristors, IGBT or MOSFET are preferably used to optimize efficiency over a broad operating range. The DC produced by each rectifier unit Ru1, Ru2 is paralleled onto the DC main bus B, which separately feeds each controller Cont1, Cont2 driving each stacked electric motor element Ee1, Ee2 of the multi-stack drive motor assembly GEMD. The controller's assemblies can either be located outside the multi-stack drive motor assembly GEMD, or integrated inside said multi-stack drive motor assembly. If required, a two-ways DC/DC converter (such as shown in FIG. 1) can be used in between the main bus B and the RESS in order to match battery and main bus voltages, save power line weight and/or provide more efficient battery usage.

In addition to improved energy efficiency, the present invention keeps the advantages brought by series-hybrid topologies, where the energy stored in the RESS, such as a battery bank, can be used during transient power demand and/or during emergencies, therefore resulting in considerably improved safety. Thus, referring to the RESS, the battery bank is dimensioned in order to be able to deliver the required power during transient power demand and emergencies. In other words, the RESS is configured to enable a full electric flight during some phases of the flight domain as well as being capable of meeting transient power demand or emergency power demand.

As in any series-hybrid system, the power produced by the batteries is combined, at the main bus level, with the power delivered by the gas turbine or internal combustion engine T. Considering the performances of modern battery cells, the RESS capacity can be dimensioned in such manner that full electric flight is possible for a few minutes. This configuration presents some obvious advantages such as better takeoff performances, and/or significant safety improvement since en engine failure does not impact the safety: the craft can land safely on electric power. Additionally, new mission profiles can be achieved, such as silent flight and zero infrared signature flight. Another advantage is the capacity of active rotor or propeller shaft R speed regulation. This capability is important during particular phases of the flight domain where the rotor or the propeller R speed tends to increase as a result of aggressive flight maneuvers. For instance, high G turns tend to increase the speed of the main rotor of a helicopter. Since the centrifugal loads increase as the square of the rotational speed, the structural limits of the rotor head are quickly reached, hence limiting the maneuverability of helicopters. Another example is the propeller R speed increasing when a fix wing aircraft is diving. In the present configuration, regenerative breaking can be applied where the multi-stack drive motor assembly GEMD acts as an inductive brake in order to prevent rotor or propeller shaft R from overspeeding. Thus, at least one of the top power branches b1 and/or b2 is capable of enabling regenerative braking in order to provide active regulation of rotor or propeller shaft speed. The energy generated during the braking operation can be fed back into the RESS, or into a dummy load. Active rotor RPM control leads to improved helicopter maneuverability, conferring a marked tactical advantage on modern battlefield. The bottom branches b3 and b4 can also be used to provide regenerative breaking by feeding the excess power into a dummy load.

Bottom Power Branches:

Each bottom power branch b3 and b4 is feeding the respective stacked electric motor element Ee3 and Ee4 of the electric motor assembly GEMD. The electric generator assembly G supplies AC to each bottom power branch b3, b4. More specifically, the AC produced by the stacked electric generator elements Eg3 and Eg4 of the electric generator assembly G is feeding the respective bottom power branches b3 and b4.

No energy storage device is used in the bottom power branches b3 and b4. Instead, two matrix converters Mc3, Mc4 are being used. The matrix converter Mc3 integrated in the bottom power branch b3 feeds the stacked electric motor element Ee3 and the other matrix converter Mc4 integrated in the other bottom power branch b4 feeds the other stacked electric motor element Ee4.

A matrix converter is a multi-port energy conversion device that comprises power switching circuitry capable of generating, from the high frequency AC produced by the electric generator assembly G, the AC signals required to drive the respective electric motor element Ee3, Ee4. Matrix converters also include one or several signal processor(s) capable of driving the internal power switching circuitry in order to generate and synchronize the waveform required to feed the windings inside each stacked electric motor element Ee3, Ee4 of the electric motor assembly GEMD. By removing rectifier, main bus and motor controller altogether, a matrix converter enables better end to end efficiency than a conventional series-hybrid topology such as those used in the top branches b1 and b2. Typically, the matrix converter configuration is several percent more efficient than a conventional series-hybrid chain such as those used by the top power branches b1, b2. Better results can be achieved when the matrix converter is optimized around a given power setting (e.g. power for cruise speed). It may by apparent to those skilled in the art that several percent represents considerable fuel savings over the aircraft's service life and brings the overall system efficiency to a level comparable to a multistage gearbox. Moreover the drastic reduction of components and subsystems leads to better reliability and lighter assemblies. Due to their inherent efficiency, matrix converters Mc3, Mc4 require little cooling, therefore resulting in lower system weight.

Figure 7:
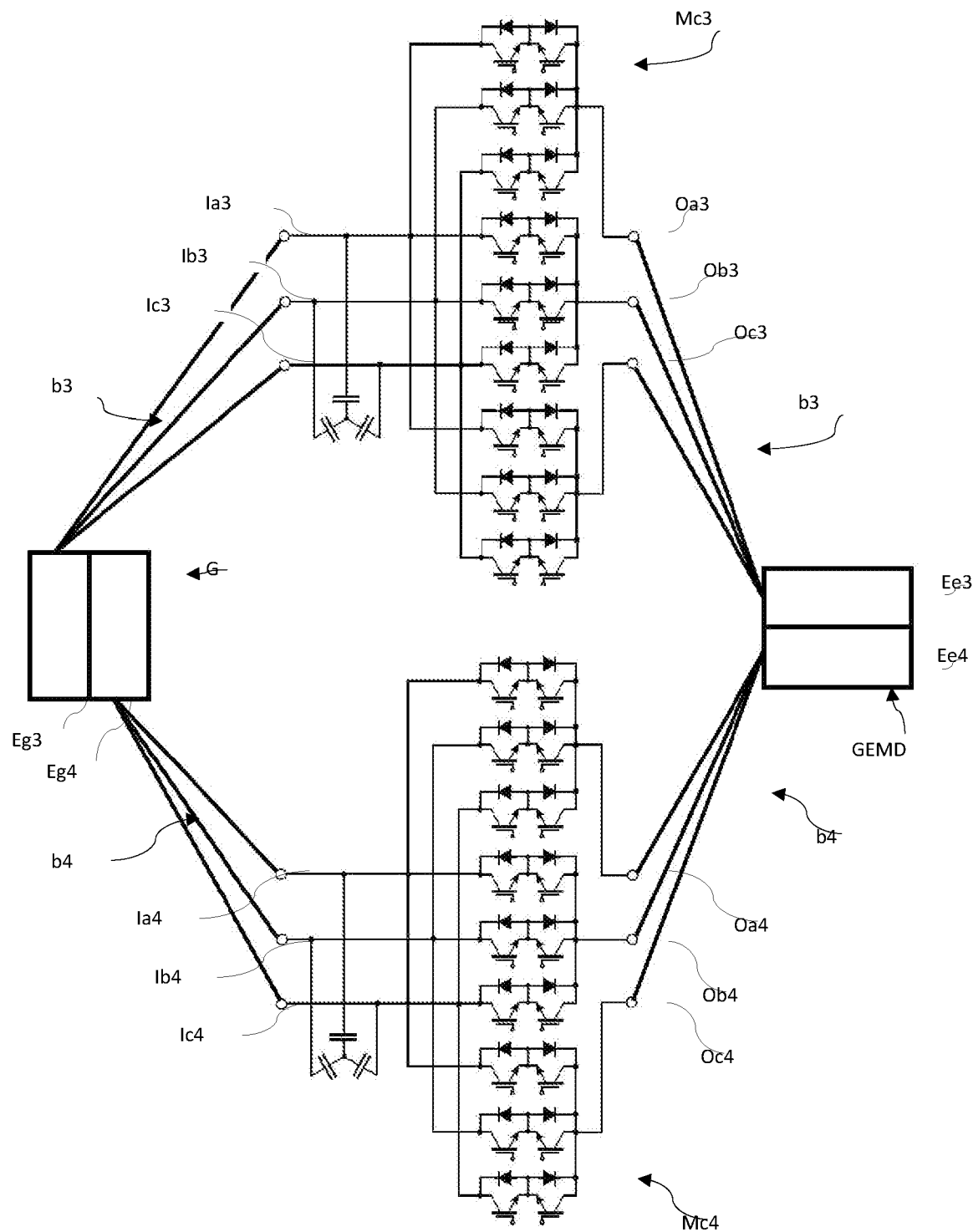
FIG. 7 depicts a direct matrix converter topology which may be employed in the electric drive train architecture according to the invention.
Figure 8:
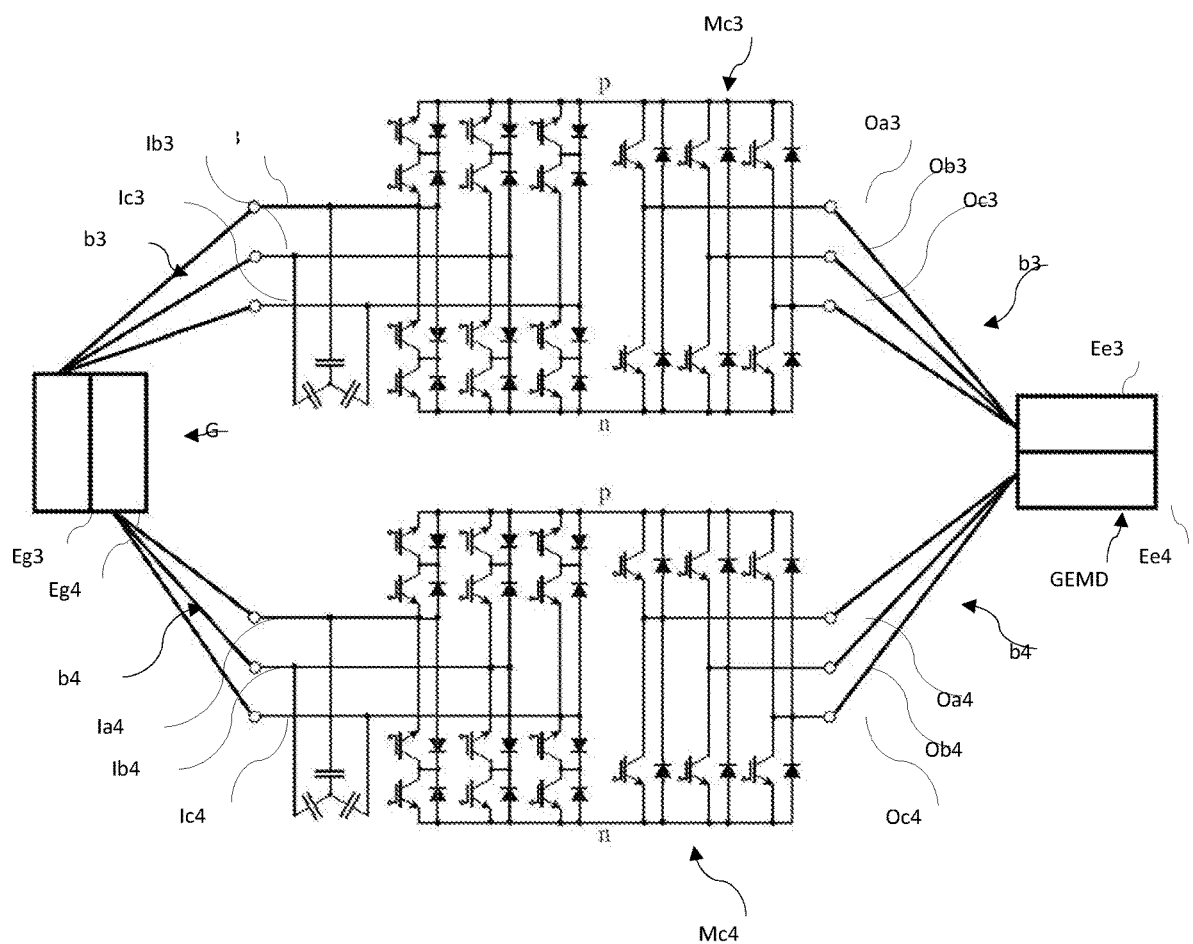
FIG. 8 depicts an indirect matrix converter topology which may be employed in the electric drive train architecture according to the invention.

The matrix converters Mc3 and Mc4 could be direct matrix converters (AC-AC) of a topology such as depicted in FIG. 7. The inputs $i_{a3}$, $i_{b3}$, $i_{c3}$ of the matrix converter Mc3 are each connected to one of the three phases of the electric generator element Eg3. And the outputs $O_{a3}$, $O_{b3}$, $O_{c3}$ of the matrix converter Mc3 are each connected to one of the three phases of the electric motor element Ee3. Conversely, the inputs $i_{a4}$, $i_{b4}$, $i_{c4}$ of the matrix converter Mc4 are each connected to one of the three phases of the electric generator element Eg4. And the outputs $O_{a4}$, $O_{b4}$, $O_{c4}$ of the matrix converter Mc4 are each connected to one of the three phases of the electric motor element Ee4. In the alternative embodiment depicted in FIG. 8, the matrix converters Mc3 and Mc4 are indirect matrix converters (AC-DC/DC-AC) with a DC-link. Other configurations are possible, for example with a direct matrix converter Mc3 in the bottom power branch b3, and an indirect matrix converter Mc4 in the bottom power branch b4. Or vice versa. Multiphase solutions (6 phases or more) are also possible in order to improve system reliability.

Power Distribution:

The power distribution between the different branches b1, b2, b3 and b4 can be either linear or discrete.

Varying the power distribution between the pairs of power branches b1-b2 and b3-b4 of the architecture depicted in FIG. 3, in function of the flight domain, leads to a system that combines the safety and transient performance advantages of a conventional series-hybrid configuration, with the good end to end efficiency of an architecture based on matrix converters.

During takeoff (or during transient power demand), the top power branches b1 and b2 and the RESS along with the bottom power branches b3 and b4, both meet the energy demand. The energy stored in the RESS is used to meet transient power demand. Accordingly, the RESS supplies current to the top power branch b1 and/or b2 in addition to the electric generator assembly G. In case of engine T or electric generator assembly G failure, the RESS is capable of meeting emergency power demand. The RESS can supply the power required to maintain straight and level flight during the time required to restart the engine T and/or reset the electric generator assembly G.

Figure 4:
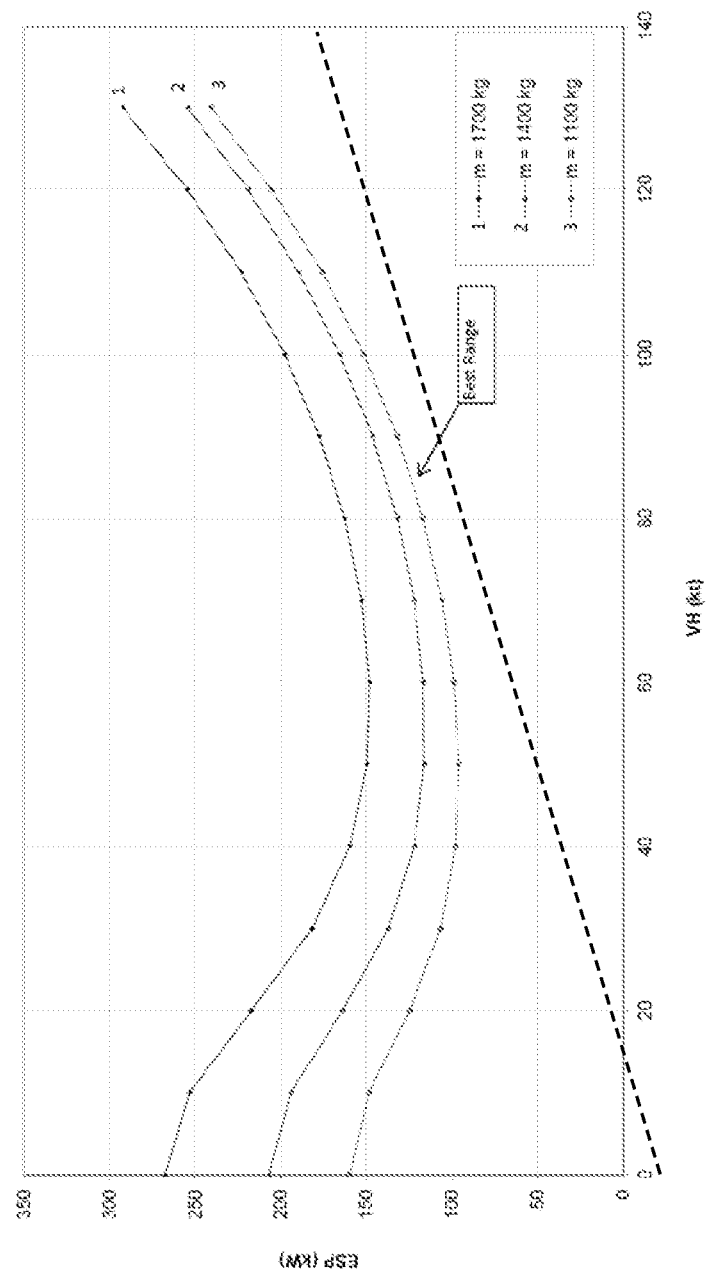
FIG. 4 shows the power requirement of a notional 1.7 ton class helicopter versus airspeed. The three curves show the power requirement for 3 different takeoff weights (1100 Kg, 1400 Kg, 1700 Kg). The X axis is the forward speed in tens of Knots, whereas the Y axis shows the required engine shaft power (ESP) in kW. The point of Maximum range for a takeoff weight of 1100 Kg is also depicted.
Figure 5:
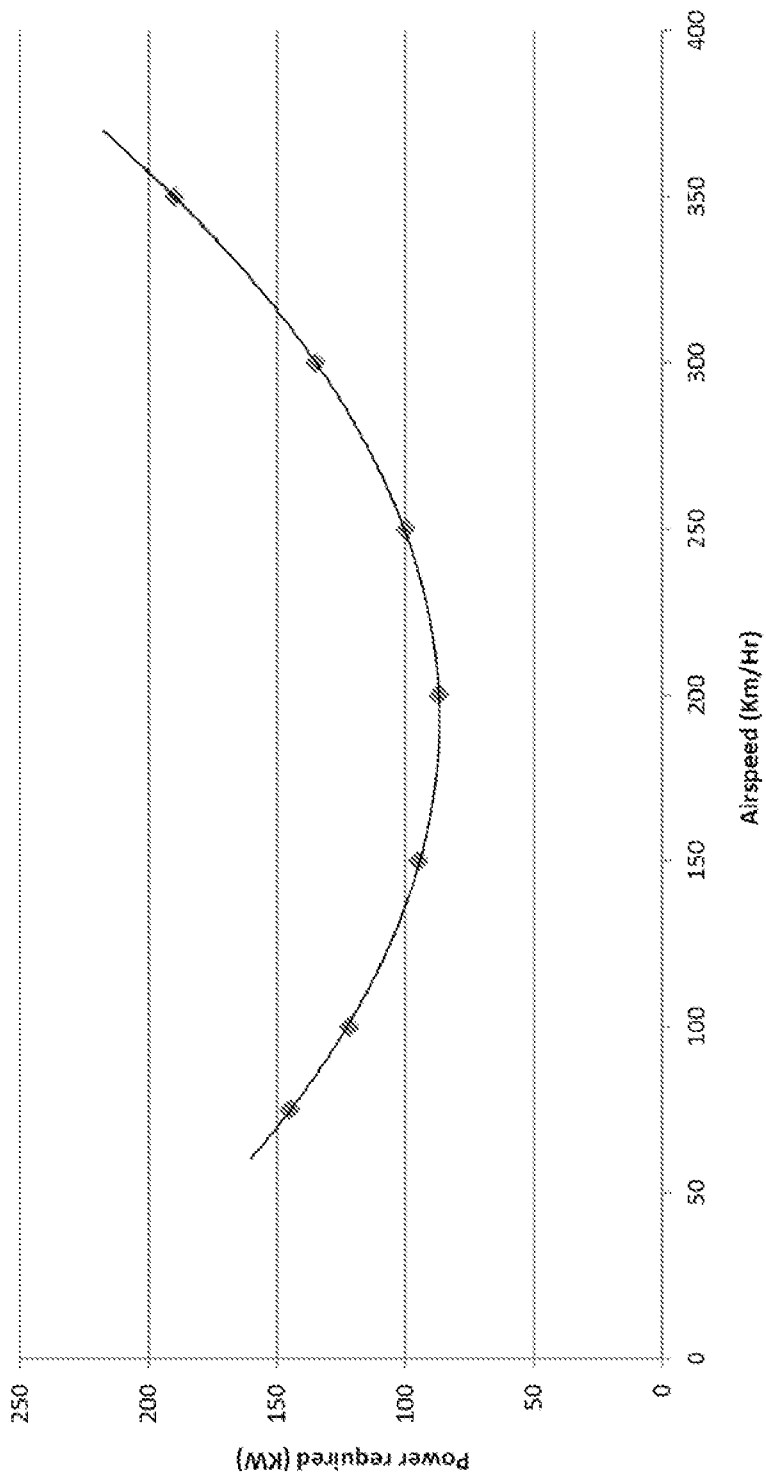
FIG. 5 shows the power requirement of a notional fix wing airplane. The X axis is the speed in km/hr and the Y axis is the power required to maintain straight and level flight, in kW.

During cruise, when the power demand is lower (refer to FIG. 4 and FIG. 5), most of the power transits via the bottom power branches b3 and b4 through the matrix converters Mc3, Mc4, and little power goes through the top power branches b1 and b2. Consequently, the end to end efficiency of the system in cruise is better than a conventional series-hybrid electric drive train as depicted in FIG. 1 or FIG. 2.

Power distribution control along the different power branches is performed by a processor unit (not depicted in the figures, for sake of clarity) that takes into account a multitude of parameters and physical values, such as (but not limited to) shaft power requirement, flight controls settings, generator status, system integrity and system health, as well as environmental parameters such as Outside Air Temperature (OAT), pressure altitude. The processor unit can be a dual channel redundant unit with built in real time integrity control system.

Power Distribution Laws:

Aforementioned patent documents FR2957207, FR2979614, and FR2979615 all make mention of "conical" and "cylindrical" configurations of the multiple-stack drive GEMD. Those definitions refer to the average power rating of each motor element constituting the stack. For instance, the stacked electric motor elements Ee1 and Ee2 as depicted in FIG. 3 are designed to mostly carry peak power during transient, climb and emergency, as well as the lowest power required to keep the aircraft airborne for the entire duration of the full electric flight. As such, their physical configuration and their cooling must be adapted to this type of workload. By the same token, stacked electric motor elements Ee3 and Ee4 will need to carry significant power during extended period of the flight, hence requiring a different physical configuration and a different cooling system than stacked electric motor elements Ee1 and Ee2. A conical configuration refers to a stack where the various electric motor elements Ee1, Ee2, Ee3, Ee4 are not all rated to the same continuous power, whereas a cylindrical configuration refers to a stack of electric motor elements all rated to the same power.

Other multi-stack configurations are possible using electric generator assembly G having different number of stacks and electric motor assembly GEMD using different number of motor elements. As an example, the electric generator assembly G could comprise only two-stack generator elements. And the electric motor assembly GEMD could also comprise only two-stack electric motor elements each one fed by his own power branch. The number of stacked electric motor elements Ee1, Ee2, Ee3, Ee4 can be different from the number of electric generator stacks Eg1, Eeg2, Eg3, Eg4. Moreover, a single top power branch b1 or b2 can feed a single electric motor element Ee1 or Ee2. Conversely a single bottom power branch b3 or b4 can feed a single electric motor element Ee3 or Ee4. A single electric generator element Eg1 or Eg2 can supply AC to a single top power branch b1 or b2. Or the two-stack electric generator elements Eg1 and Eg2 can be used to feed a single top power branch b1 or b2. Conversely, a single-stack electric generator element Eg3 or Eg4 can supply AC to a single bottom power branch b3 or b4. Or the two-stack electric generator elements Eg3 and Eg4 can be used to feed a single bottom power branch b3 or b4.

It will become evident to those skilled in the art that the present topology removes the need for Auxiliary Power Unit (APU), as the built in the RESS and its associated turbine can be used to supply the onboard power when the aircraft in on the ground. A light DC/DC converter can be used to lower the RESS voltage down to the avionics' voltage resulting is significant weight savings (the turbine section of a 90 KW APU for a medium size helicopter is around 65 Kg to 80 Kg, to which the generator must be added).

Figure 3A:
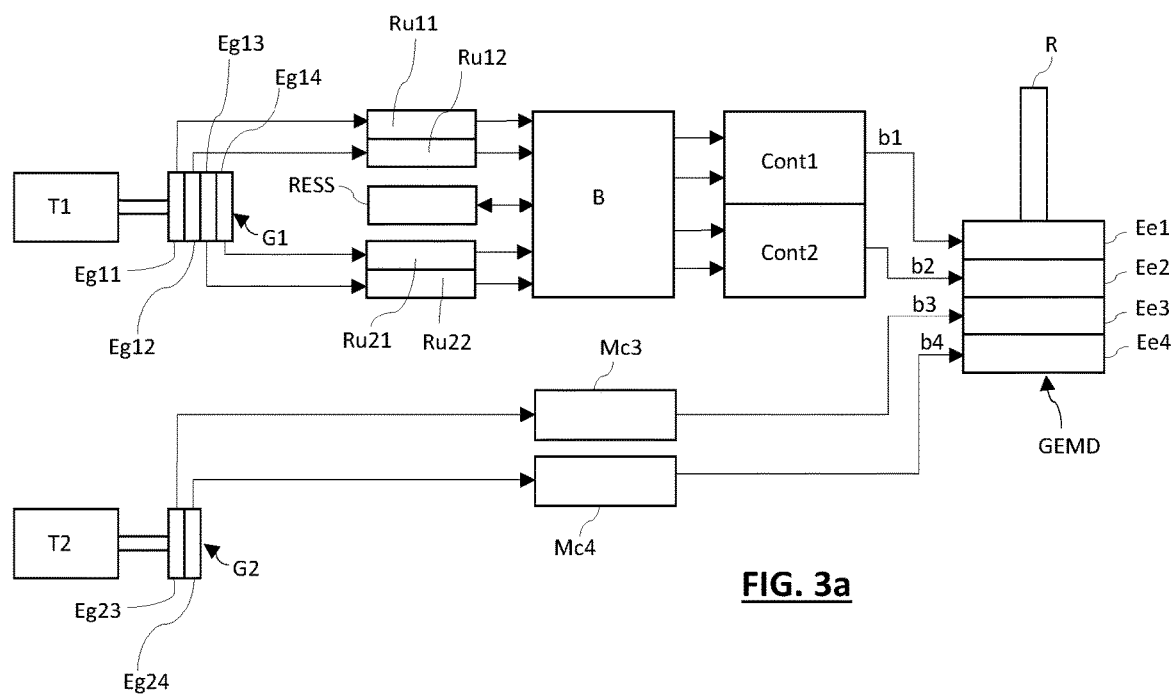
FIG. 3a is a block diagram depicting a series-hybrid electric drive train architecture according to the invention in accordance with another illustrative embodiment.

Second Embodiment—FIG. 3a

The disclosed invention can advantageously be applied to two twin engine aircrafts. The drawbacks inherent to conventional twin engine aircrafts have been previously exposed. Applying the disclosed architecture to the twin engine configuration improves both performances and safety during OEI transition as the RESS eliminates transient power lag. Additionally, significant economical advantages are brought by the disclosed configuration.

FIG. 3a presents a series-hybrid electric drive train architecture in accordance with another illustrative embodiment of the invention. This disclosed architecture uses the same multi-stack electric motor assembly GEMD as depicted in FIG. 2 and FIG. 3 and provides the same benefits and advantages of those depicted above in reference to said FIG. 3.

Two physically distinct engines T1 and T2 are used to power the notional four-stack drive GEMD, via the two completely independent pairs of power branches, b1-b2 and b3-b4. Each pair of power branches uses a different topology.

The top engine T1 drives the electric generator assembly G1 and the bottom engine T2 drives the electric generator assembly G2. The electric generator assemblies G1 and G2 are physically distinct. The engines T1 and T2 are similar to the engine T described in reference to first embodiment. And the generator assemblies G1 and G2 are similar to the generator assembly G described above in reference to first embodiment. The only difference being that the generator assembly G2 is a two-stack generator comprising two stacked electric generator elements Eg23 and Eg24.

The four stack electric generator assembly G1 mounted on the top engine T1 feeds the top power branches b1 and b2 and subsequently the stacked electric motor elements Ee1 and Ee2 of the electric motor assembly GEMD, via a conventional series-hybrid topology. More specifically, the AC produced by the stacked electric generator element Eg11, Eg12, Eg13 and Eg14 is converted into DC by using rectifier units Ru11, Ru12, Ru21, Ru22 similar to the rectifier units Ru1, Ru2 described above. The DC produced by each rectifier unit Ru11, Ru12, Ru21, Ru22 is paralleled onto the DC main bus B, which separately feeds each controller Cont1, Cont2 driving the associated stacked electric motor elements Ee1, Ee2 of the multi-stack drive motor assembly GEMD. The controller's assemblies can either be located outside the multi-stack drive motor assembly GEMD, or integrated inside said multi-stack drive motor assembly. If required, a two-ways DC/DC converter (such as shown in FIG. 1) can be used in between the main bus B and the RESS in order to match battery and main bus voltages and/or provide more efficient battery usage (not shown, for the sake of simplicity).

The two-stack electric generator assembly G2 mounted on the bottom engine T2 feeds the stacked electric motor elements Ee3 and Ee4 of the electric motor assembly GEMD, via the two independent matrix converters Mc3 and Mc4.

Combining the multi-stack architecture of the electric motor assembly GEMD with a twin-engine layout using two different pairs of power branches results in drastically reduced single points of failure, thus leading to improved reliability. FIG. 3a depicts a topology where a four-stack electric generator assembly G1 is driven by the top engine T1 and a two stack electric generator assembly G2 is driven by the bottom engine T2, along with a four-stack electric motor assembly GEMD; however, electric generators assemblies G1, G2 and electric motor assembly GEMD using different number of stacks are possible. As an example, the electric generator assembly G1 could comprise only a two-stack electric generator. Moreover, a single top power branch b1 or b2 can feed a single electric motor element Ee1 or Ee2. Conversely, a single bottom power branch b3 or b4 can feed a single electric motor element Ee3 or Ee4. A single electric generator element Eg11, Eg12, Eg13 or Eg14 can supply AC to a single top power branch b1 or b2. Or all the four stacked electric generator elements Eg11, Eg12, Eg13 and Eg14 can be used to feed a single top power branch b1 or b2. As well, a single electric generator element Eg23 or Eg24 can supply AC to a single bottom power branch b3 and/or b4. Or all the two stacked electric generator elements Eg23 and Eg24 can be used to feed a single bottom power branch b3, or b4.

Figure 6:
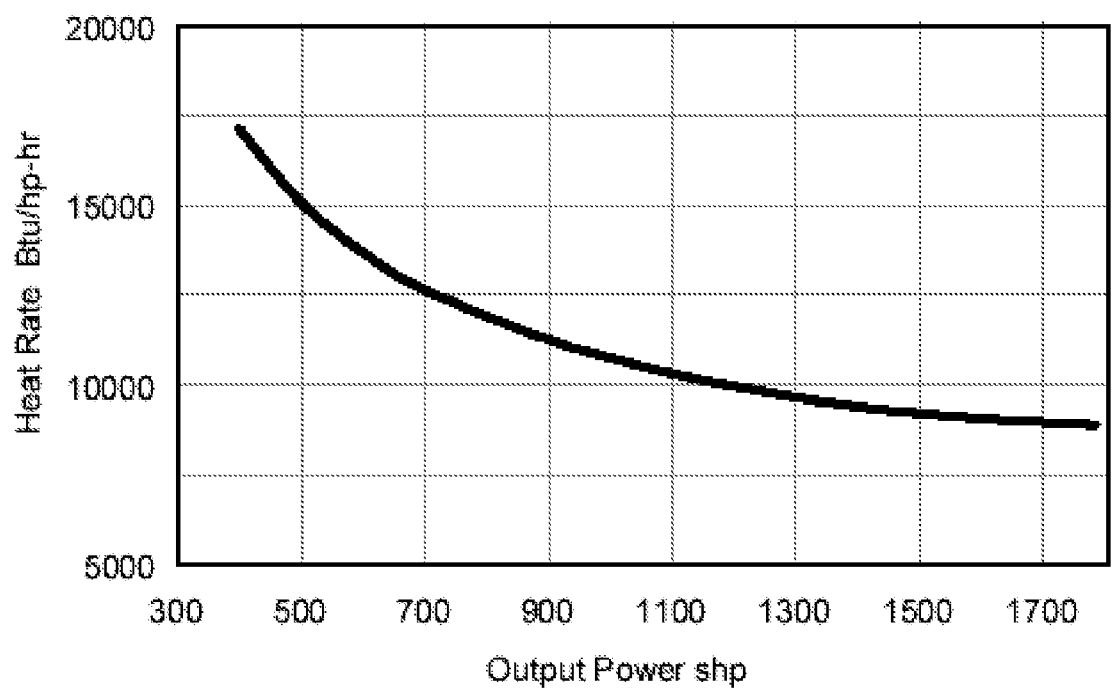
FIG. 6 depicts the heat rate (which relates to specific fuel consumption) of a notional gas turbine versus its output power.

In this configuration, the top engine T1 and the bottom engine T2 can be rated to the same maximum power (identical engines), or can have different sizes, depending on the Maximum continuous power requirement of the envisioned mission profile. The bottom engine T2 can be an engine rated at to a higher power than the top engine T1 (larger size engine), in order to provide the power necessary during cruise. In this configuration, the bottom engine T2 can operate near to its maximum power output, where its specific fuel consumption is the lowest (refer to FIG. 6). The top engine T1 can be shut down during cruise in view of operating at the lowest burn rate. In case of failure of the bottom engine T2, the RESS can supply the power required to maintain straight and level flight during the time required to restart the top engine T1. The top engine T1 may be dimensioned in such a way to produce the power corresponding to the best endurance speed. Thus, one engine can be switched off during certain part of the flight domain such as during cruise. One drawback of this configuration is the impossibility to recharge the RESS during flight once the top engine T1 is shut down (as the energy stored in the RESS can be used during short climbs or transient power demands). Moreover, the engines T1 and T2 can be of different nature; for instance, the top engine T1 can be a gas turbine, whereas the bottom engine T2 can be a piston engine for better fuel efficiency during cruise. Reverse configurations are also possible to match specific mission profiles.

Figure 3B:
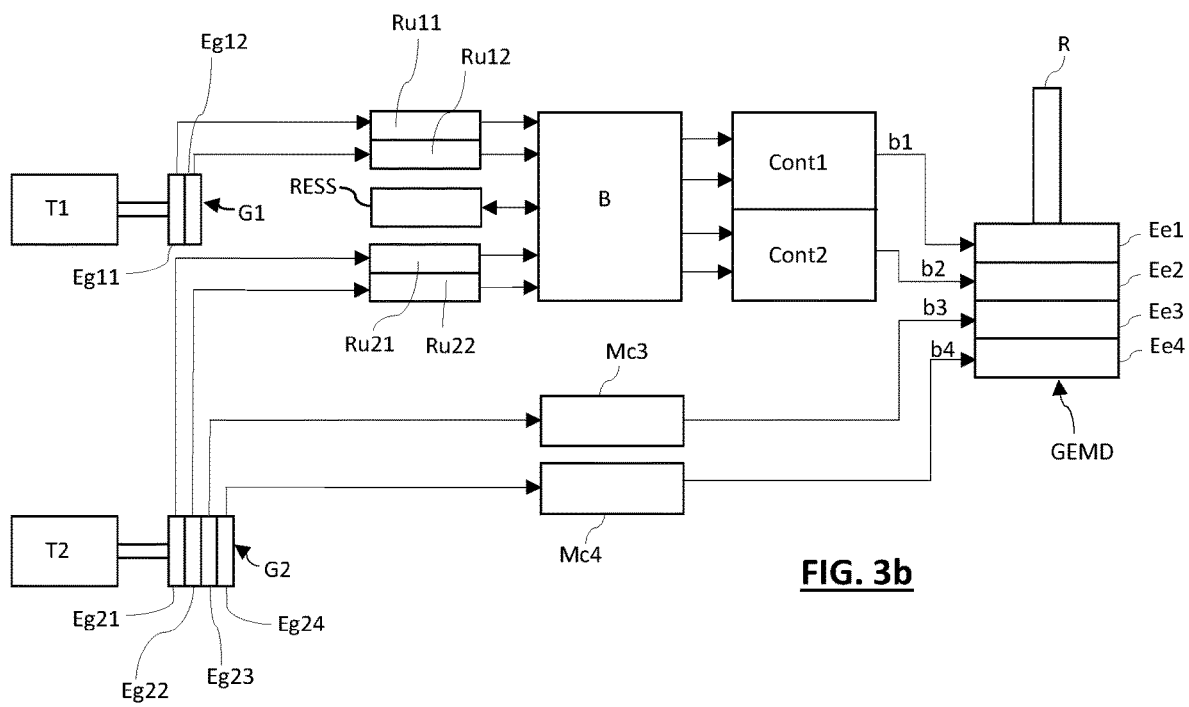
FIG. 3b is a block diagram depicting a series-hybrid electric drive train architecture according to the invention in accordance with yet another illustrative embodiment.

Third Embodiment—FIG. 3b

FIG. 3b presents a series-hybrid electric drive train architecture in accordance with yet another illustrative embodiment of the invention. The disclosed architecture uses the same multi-stack electric motor assembly GEMD as depicted in FIG. 2, FIG. 3 and FIG. 3a and provides the same benefits and advantages of those depicted above in reference to said FIG. 3 and FIG. 3a.

The two physically distinct engines T1 and T2 are used to power the notional four-stack drive GEMD via the two pairs of power branches, b1-b2 and b3-b4, respectively. The engines T1 and T2 are similar to the engines T1 and T2 described above in reference to second embodiment.

The electric generator assemblies G1 and G2 are similar to the electric generator assemblies G1 and G2 described above in reference to second embodiment, the only difference being that the electric generator assembly G1 is a two-stack generator comprising two stacked electric generator elements Eg11 and Eg12, and that the electric generator assembly G2 is a four-stack generator comprising four stacked electric generator elements Eg21, Eg22, Eg23 and Eg24.

The top engine T1 drives the two stack electric generator assembly G1 connected to two rectifiers Ru11 and Ru12 of a conventional series-hybrid configuration, subsequently feeding the stacked electric motor elements Ee1 and Ee2 of the multi-stack drive GEMD as described above in reference to FIG. 3a.

The bottom engine T2 drives the four-stack electric generator assembly G2, of which the two stacks Eg23 and Eg24 are respectively connected to the matrix converter Mc3 and Mc4 feeding the stacked electric motor elements Ee3 and Ee4 of the electric motor assembly GEMD as described above.

Each one of the two remaining stacks Eg21 and Eg22 of the electric generator assembly G2 is respectively cross connected to the input of a rectifier Ru21 and Ru22 feeding to the conventional series-hybrid top power branches b1 and b2. Thus, the drive train comprises various power branches with electrical cross connection at generator level (at front end level). The cross connection enables one engine (T2) to simultaneously feed both pairs of branches b1-b2 and b3-b4. One direct advantage of this configuration is to thermally unload stacked electric motor elements Ee3 and Ee4 of the electric motor assembly GEMD during high power cruise. For instance:

two third of the power produced by the bottom engine T2 can transit through the two matrix converters Mc3 and Mc4, each one feeding one of the stacked electric motor elements Ee3 and Ee4 of the electric motor assembly GEMD, whereas the remaining third of the power produced by the bottom engine T2 can transit through the top power branches b1 and b2 subsequently feeding the stacked electric motor elements Ee1 and Ee2 of the electric motor assembly GEMD.

The power balancing process between the different pairs of power branches b1-b2, and b3-b4 can use other distribution ratios to optimize the efficiency in function of the thermal limits of the stacked electric motor elements Ee1, Ee2, Ee3, Ee4 of the electric motor assembly GEMD and flight domain. In this configuration, the bottom engine T2 can be rated to a higher power than the top engine T1, and can therefore be solely used during cruise at its most thermodynamically efficient operating point, whilst the top engine T1 may be shut down. Furthermore, the front end cross connection enables recharging the RESS which energy that can be used during climbs or various manoeuvres requiring transient power, without needing to restart the top engine T1. This solution combines the efficiency advantages of the matrix converter with the flexibility of conventional series-hybrid topologies.

One advantage of this configuration is that the engines T1 and T2 can be dissimilar engines, in which the top engine T1, in addition of being lighter and smaller than the bottom engine T2, operates at a considerably lower duty cycle than the bottom engine T2, thus leading to reduced maintenance and lowered operating cost.

When applied to a twin-engine configuration, the disclosed invention presents significant performance and safety improvements where cross feeding combined with the RESS enable OEI operation without incurring transient power losses. Moreover, the disclosed architectures bring substantial economical advantages over conventional twin engine configuration by enabling single engine cruise, on one engine (T2) operating at its best SFC, hence optimized fuel burn. In an improved configuration, both cruise (T2) and supplementary engine (T1) can be of different sizes and rated at different power; with both of them operating during the takeoff and landing phases, whereas only one engine (T2) operates during cruise.

FIG. 3b depicts a topology whereby a two-stack electric generator assembly G1 is driven by the top engine T1 and a four stack electric generator assembly G2 is driven by the bottom engine T2, along with a four-stack drive GEMD; however electric generators assemblies G1 and/or G2 and electric motor assembly GEMD using different number of stacks are possible. Moreover, a single top power branch b1 or b2 can feed a single electric motor element Ee1 or Ee2. Conversely a single bottom power branch b3 or b4 can feed a single electric motor element Ee3 or Ee4. A single electric generator element Eg11 or Eg12 can supply AC to a single top power branch b1 or b2. Or all the two stacked electric generator elements Eg11 and Eg12 can be used to feed a single top power branch b1 or b2. Conversely, a single electric generator element Eg21, Eg22, Eg23 or Eg24 can supply AC to a single bottom power branch b3 or b4. Or all the four stacked electric generator elements Eg21, Eg22, Eg23, and Eg24 can be used to feed a single bottom power branch b3 or b4.

Figure 3C:
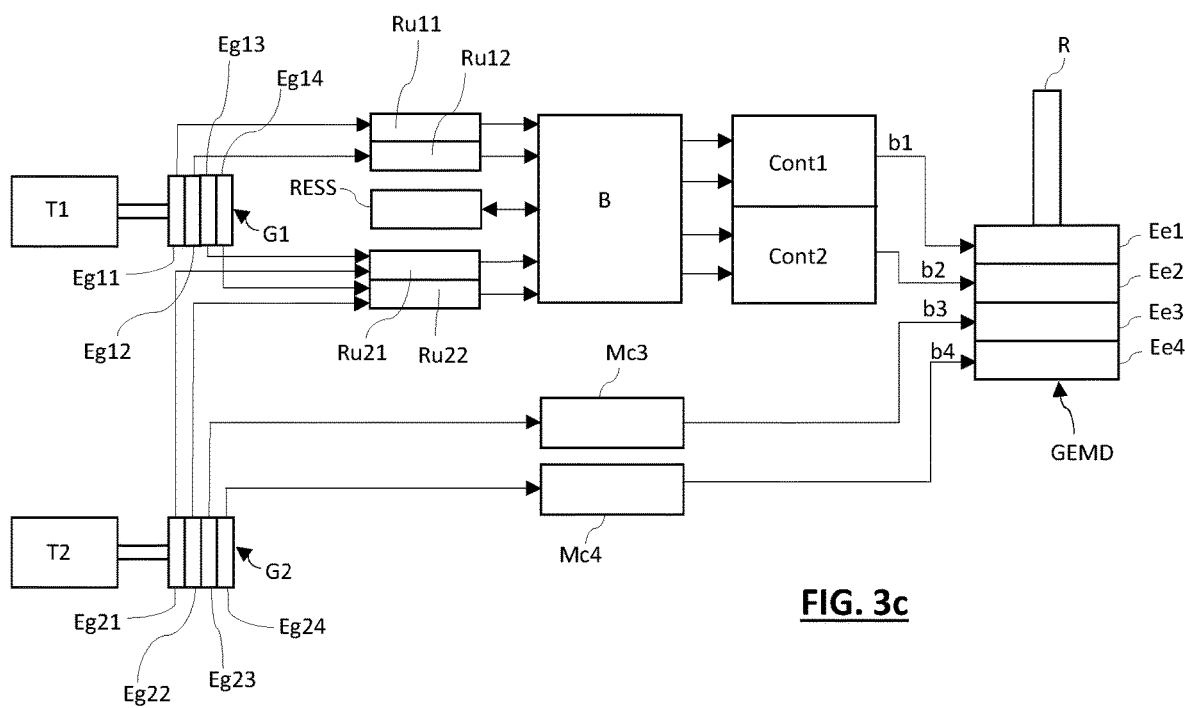
FIG. 3c is a block diagram depicting a series-hybrid electric drive train architecture according to the invention in accordance with yet another illustrative embodiment.

Fourth Embodiment—FIG. 3c

FIG. 3c presents a series-hybrid electric drive train architecture in accordance with yet another illustrative embodiment of the invention. This disclosed architecture uses the same notional multi-stack electric motor assembly GEMD as depicted in FIG. 2, FIG. 3, FIG. 3a and FIG. 3b and provides the same benefits and advantages of those depicted above in reference to said FIG. 3, FIG. 3a and FIG. 3b.

The two physically distinct engines T1 and T2 are used to power the four-stack drive GEMD via the two pairs of power branches, b1-b2 and b3-b4, respectively.

The engines T1 and T2 are similar to the engines T1 and T2 described above in reference to second and third embodiments. The electric generator assemblies G1 and G2 are physically distinct and are similar to the electric generator assembly G described above in reference to first embodiment. Accordingly, engines T1 and T2 are both driving four stack electric generators assemblies G1 and G2.

The four-stack electric generator assembly G1 mounted on the top engine T1 feeds the top power branches b1, b2 and subsequently the stacked electric motor elements Ee1 and Ee2 of the electric motor assembly GEMD, via a conventional series-hybrid topology as described above in reference to FIG. 3a and FIG. 3b.

The bottom engine T2 drives the four-stack electric generator assembly G2, of which two stacks Eg23 and Eg24 are connected to the matrix converter Mc3 and Mc4, respectively, thus feeding the stacked electric motor elements Ee3 and Ee4 of the electric motor assembly GEMD as previously described. Each one of the two remaining stacks Eg21 and Eg22 of the electric generator assembly G2 is cross connected to the dual input rectifier Ru21 and Ru22, respectively, subsequently feeding the conventional series-hybrid top power branches b1 and b2.

In this configuration, half of the stacked electric motor elements of the bottom electric generator assembly G2 are symmetrically cross connected at front-end level to the opposite pair of power branches b1-b2. In this configuration, dual input rectifiers Ru21 and Ru22 are used. This configuration presents all the advantages detailed in FIG. 3b, however, given the fact that the cross connection is now completely symmetrical, different combinations of power routing can be used in order to optimize either the efficiency, the load sharing, or the power availability across a broad range of flight domains and mission profiles. In this configuration, top engine T1 and bottom engine T2 may be preferably rated to the same power, although configurations using dissimilar engines such as detailed in FIG. 3b are also possible.

FIG. 3c depicts a topology where a four-stack electric generator assembly G1 is driven by the top engine T1 and a four stack electric generator assembly G2 is driven by the bottom engine T2, along with a four-stack drive GEMD; however electric generators assemblies G1 and/or G2 and electric motor assembly GEMD using different number of stacks are possible. Moreover, a single power branch b1 or b2 can feed only one stacked electric motor element Ee1 or Ee2. Conversely a single bottom power branch b3 or b4 can feed a single electric motor element Ee3 or Ee4. A single electric generator element Eg11, Eg12, Eg13 or Eg14 can supply AC to a single top power branch b1 or b2. Or all the four stacked electric generator elements Eg11, Eg12, Eg13 and Eg14 can be used to feed a single top power branch b1 or b2. Conversely, a single electric generator element Eg21, Eg22, Eg23 or Eg24 can supply AC to a single bottom power branch b3 or b4. Or all the four stacked electric generator elements Eg21, Eg22, Eg23 and Eg24 can be used to feed a single bottom power branch b3 or b4.

Figure 3D:
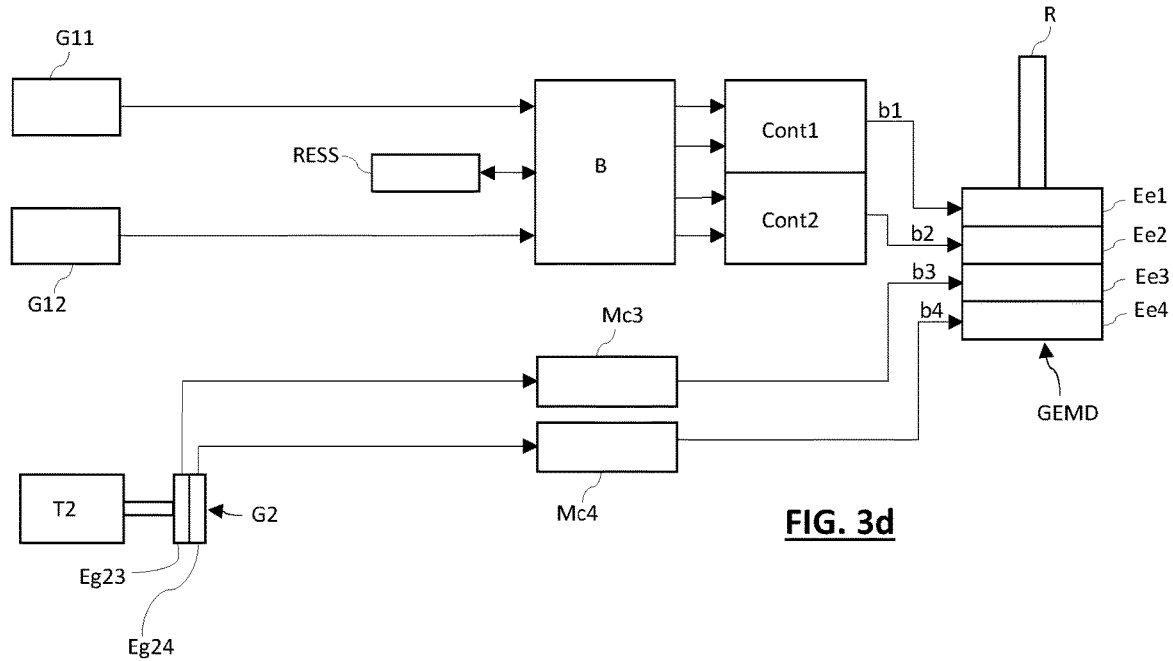
FIG. 3d is a block diagram depicting a series-hybrid electric drive train architecture according to the invention in accordance with yet another illustrative embodiment.

Fifth Embodiment—FIG. 3d

FIG. 3d presents a series-hybrid electric drive train architecture in accordance with yet another illustrative embodiment of the invention. This disclosed architecture uses the same notional multi-stack electric motor assembly GEMD as depicted in FIG. 2, FIG. 3, FIG. 3a, FIG. 3b and FIG. 3c and provides the same benefits and advantages of those depicted above in reference to said FIG. 3, FIG. 3a, FIG. 3b and FIG. 3c.

Two DC generators G11, G12 and one engine T2 are used to power the four-stack drive GEMD, via the two independent pairs of power branches, b1-b2 and b3-b4, respectively.

The engine T2 drives the electric generator assembly G2. The engine T2 and the electric generator assembly G2 are similar to those described above in reference to second embodiment. The generators G11, G12 and electric generator assembly G2 are physically distinct.

The electric generators G11 and G12 supply DC to the top power branches b1 and b2. They are preferably selected (but not limiting to) from the following list: fuel cell, photovoltaic cells (or solar panels), magnetohydrodynamic generator, radio-isotopic generator, thermo-electric or electrochemical generator, beta cells battery. This topology may become advantageous when G11 and G12 use fuel cells, subsequently reducing carbon footprint, and drastically lowering infrared and acoustic signatures (when compared with engines T and T1 describe above).

Accordingly, the DC generators G11 and G12 feed the top power branches b1 and b2 and subsequently the stacked electric motor elements Ee1 and Ee2 of the electric motor assembly GEMD, via a series-hybrid topology. More specifically, the DC produced by the generators G11 and G12 is paralleled onto the DC main bus B, which separately feeds each controller Cont1, Cont2 driving the associated stacked electric motor elements Ee1, Ee2 of the multi-stack drive motor assembly GEMD. The controller's assemblies can either be located outside the multi-stack drive motor assembly GEMD, or integrated inside said multi-stack drive motor assembly GEMD. If required, a two-ways DC/DC converter (such as shown in FIG. 1) can be used in between the main bus B and the battery RESS in order to match battery and main bus voltages, lower power line weight and/or provide optimum battery usage. As the electric generators G11 and G12 produce DC, rectifier units Ru11, Ru12 described in reference to FIG. 3a, FIG. 3b or FIG. 3c are unnecessary.

The two-stack electric generator assembly G2 mounted on the bottom engine T2 feeds the stacked electric motor elements Ee3 and Ee4 of the electric motor assembly GEMD, via the two independent matrix converters Mc3 and Mc4.

FIG. 3d depicts a topology whereby a two-stack electric generator G2 is used on the bottom engine T2 along with a four-stack drive GEMD; however electric generator assembly G2 and electric motor assembly GEMD using different number of stacks are possible. Also, a single electric generator G11 or G12 can be used to feed the top power branches b1 and b2. Or all the two electric generators G11 and G12 can be used to feed a single top power branch b1 or b2. Or, a single electric generator G11 or G12 can be used to feed a single top power branch b1 or b2. Moreover, a single bottom power branch b3 or b4 can feed a single electric motor element Ee3 or Ee4. A single electric generator element Eg23 or Eg24 can supply current to a single bottom power branch b3 or b4. Or all the two stacked electric generator elements Eg23 and Eg24 can be used to feed a single bottom power branch b3 or b4.

Figure 3E:
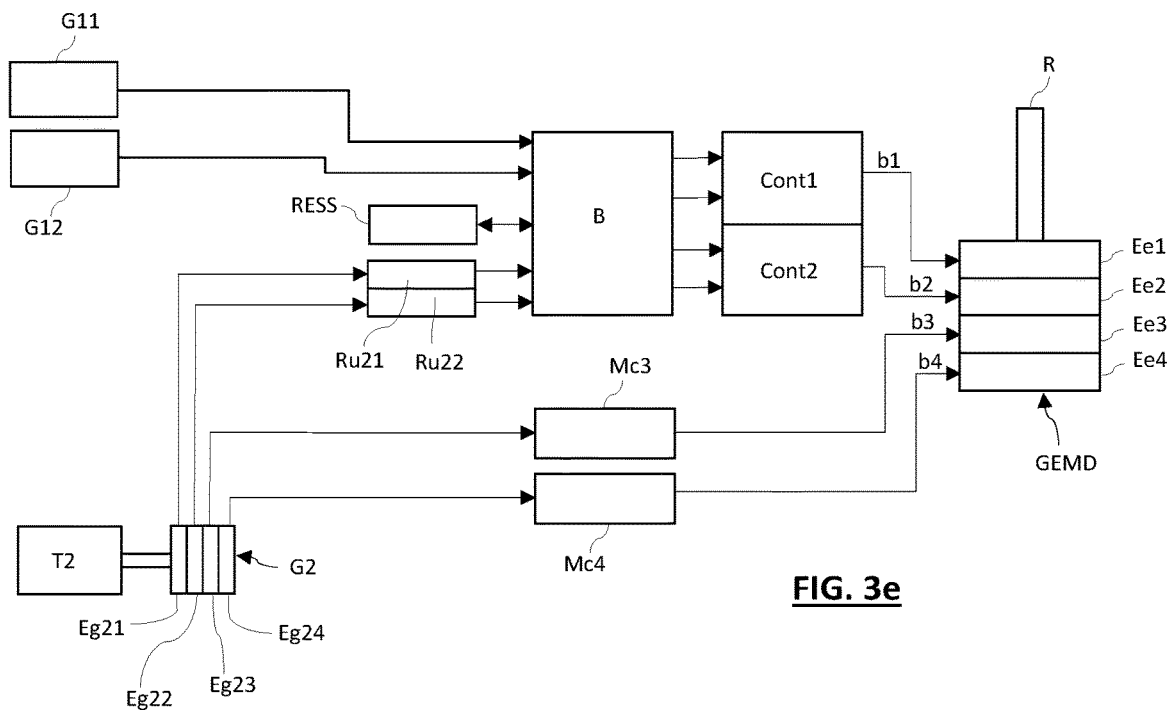
FIG. 3e is a block diagram depicting a series-hybrid electric drive train architecture according to the invention in accordance with yet another illustrative embodiment.

Sixth Embodiment—FIG. 3e

FIG. 3e presents a series-hybrid electric drive train architecture in accordance with yet another illustrative embodiment of the invention. This disclosed architecture uses the same notional multi-stack electric motor assembly GEMD as depicted in FIG. 2, FIG. 3, FIG. 3a, FIG. 3b, FIG. 3c and FIG. 3d and provides the same benefits and advantages of those depicted above in reference to said FIG. 3, FIG. 3a, FIG. 3b, FIG. 3c and FIG. 3d.

Two DC generators G11, G12 and one engine T2 are used to power the four-stack drive GEMD, via the two pairs of power branches, b1-b2 and b3-b4, respectively. The engine T2 drives the electric generator assembly G2. The DC generators G11 and G12 are similar to those described above in reference to the fifth embodiment. The engine T2 and the electric generator assembly G2 are similar to those described above in reference to the third or fourth embodiments. The electric generators G11, G12 and the electric generator assembly G2 are physically distinct.

Accordingly, the DC generators G11 and G12 feed the top power branches b1 and b2 and subsequently the stacked electric motor elements Ee1 and Ee2 of the electric motor assembly GEMD, via a series-hybrid topology described above in reference to FIG. 3d.

The bottom engine T2 drives the four-stack electric generator assembly G2, of which two stacks Eg23 and Eg24 are connected to the matrix converter Mc3 and Mc4 respectively, thus feeding the stacked electric motor elements Ee3 and Ee4 of the electric motor assembly GEMD as described above in reference to FIGS. 3b and 3c.

Each one of the two remaining stacks Eg21 and Eg22 of the electric generator assembly G2 is cross connected at front-end level to the top power branches b1 and b2, via the rectifiers Ru21 and Ru22 respectively, as described above in reference to FIG. 3b. This cross-feed topology enables better load sharing and higher power density.

FIG. 3e depicts a topology whereby a four-stack electric generator assembly G2 is driven by the bottom engine T2, along with a four-stack drive GEMD; however, electric generator assembly G2 and electric motor assembly GEMD using different number of stacks are possible. Also, a single electric generator G11 or G12 can be used to feed the top power branches b1 and b2. Conversely, both electric generators G11 and G12 can be used to feed a single top power branch b1 or b2. Or, a single electric generator G11 or G12 can be used to feed a single top power branch b1 or b2. Moreover, a single electric generator element Eg21, Eg22, Eg23 or Eg24 can supply AC to a single bottom power branch b3 or b4. By the same token, all the four-stack electric generator elements Eg21, Eg22, Eg23 and Eg24 can be used to feed a single bottom power branch b3 or b4.

Figure 3F:
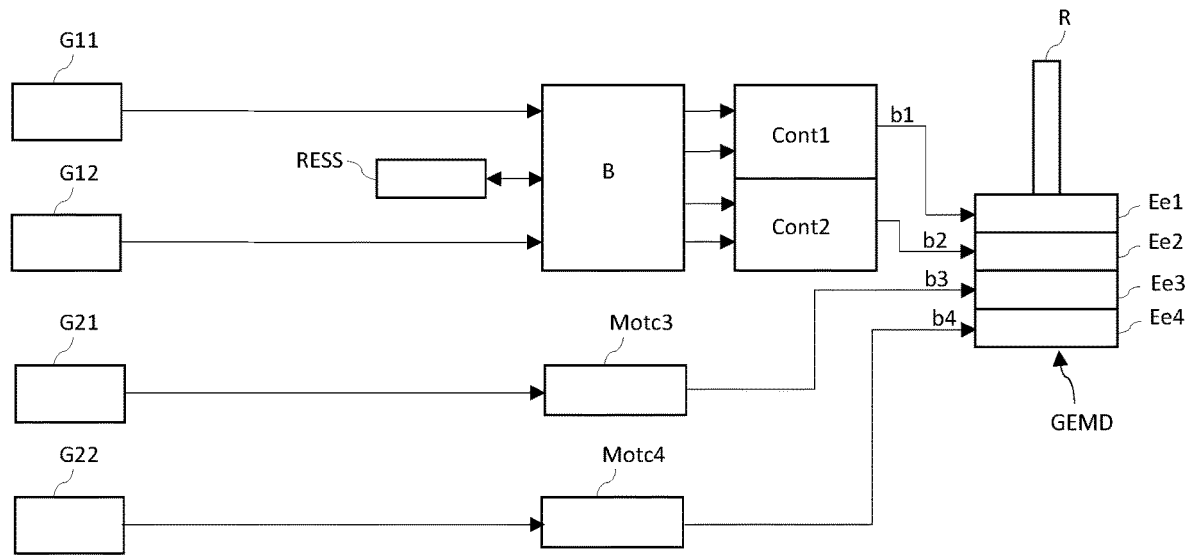
FIG. 3f is a block diagram depicting an electric drive train architecture according to the invention in accordance with an illustrative embodiment.

Seventh Embodiment—FIG. 3f

FIG. 3f depicts an electric drive train architecture in accordance with yet another illustrative embodiment of the invention. This disclosed architecture uses the same notional multi-stack electric motor assembly GEMD as depicted in FIG. 2, FIG. 3, FIG. 3a, FIG. 3b, FIG. 3c, FIG. 3d and FIG. 3e.

Four DC generators G11, G12, G21, G22 are used to power the four-stack drive GEMD, via the two independent pairs of power branches, respectively b1-b2 and b3-b4. The DC generators G11, G12, G21 and G22 could be physically distinct and are similar to those described above in reference to the fifth and sixth embodiments. They are preferably selected (but not limiting to) from the following list: fuel cell, photovoltaic cells (or solar panels), magnetohydrodynamic generator, radio-isotopic generator, thermo-electric or electrochemical generator, beta cells battery. This topology may become advantageous when G11, G12, G21 G22 use fuel cells, resulting to exceptional thermodynamic efficiency, low or zero carbon footprint, silent operation along with zero infrared signature.

The bottom electric generators G21 and G22 supply DC to the bottom power branches b3 and b4, respectively.

Accordingly, the electric generators G11 and G12 feed the top power branches b1 and b2 and subsequently the stacked electric motor elements Ee1 and Ee2 of the electric motor assembly GEMD, via a series-hybrid topology described above in reference to FIG. 3d and FIG. 3e.

Each one of the bottom electric generators G21 and G22 feeds the stacked electric motor element Ee3 and Ee4 of the electric motor assembly GEMD, via two independent motor controllers Motc3 and Motc4. Those motor controllers Motc3, Motc4 convert the DC supplied by the bottom electric generators G21 and G22 to bottom power branches b3 and b4 into the AC waveform required to feed the stator windings of stacked electric motor elements Ee3 and Ee4. Each motor controller Motc3, Motc4 converts the DC supply voltage provided by electric generators G21 and G22 to variable frequency output and controls output current flow. Pulse width modulation (PWM) control is an example of a control method used by the motor controllers Motc3 and Motc4 for driving the motor elements Ee3 and Ee4. More specifically, the motor controllers Motc3, Motc4 comprise power switching circuitry capable of generating, from the DC coming from the electric generators G21, G22, the AC signals required to drive the respective electric motor element Ee3, Ee4. The motor controllers Motc3, Motc4 also include one or several signal processor(s) capable of driving the internal power switching circuitry in order to generate the waveform required to feed the windings of each stacked electric motor element Ee3, Ee4.

Figure 9:
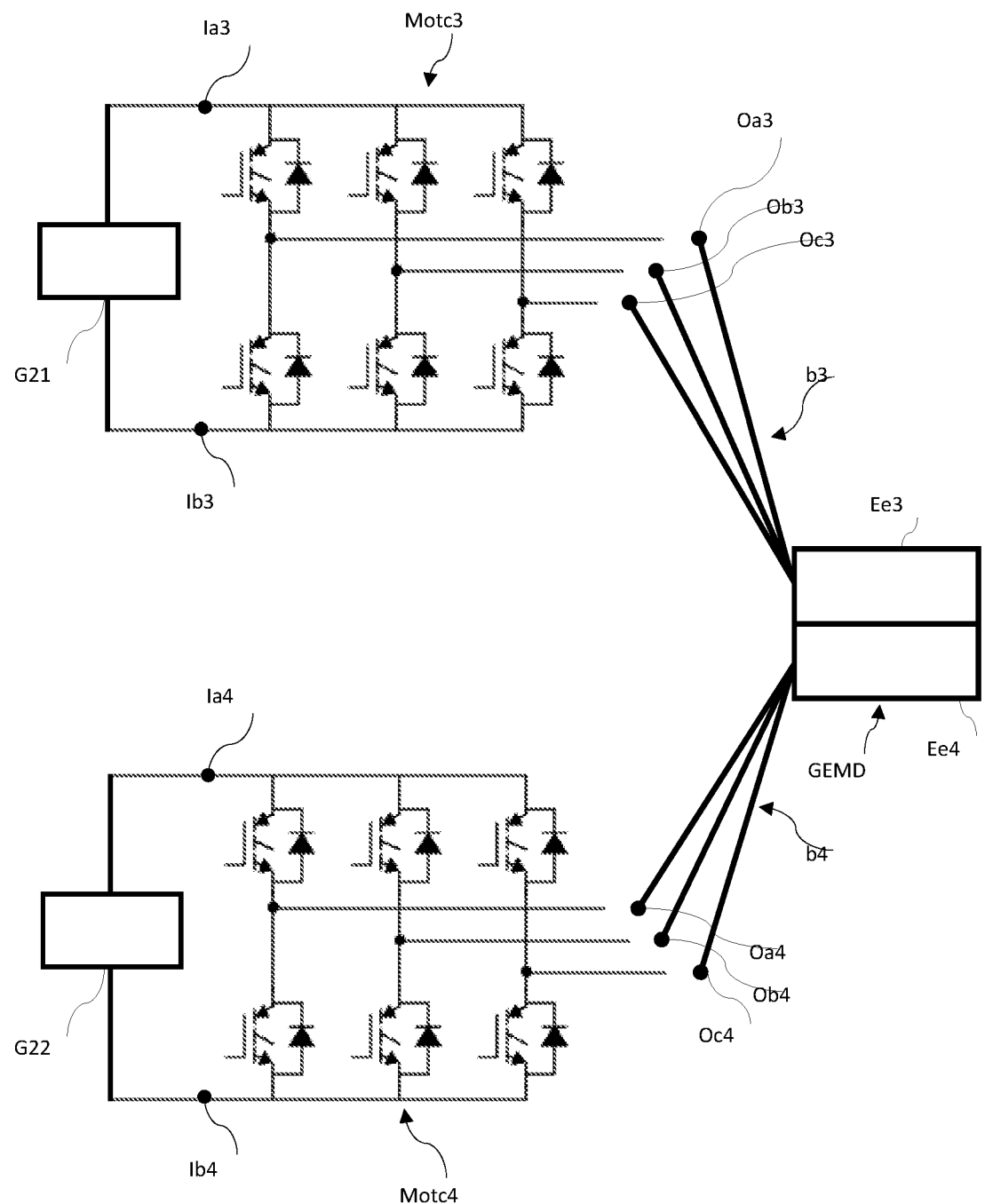
FIG. 9 depicts a motor controller topology which may be employed in the electric drive train architecture according to the invention.

FIG. 9 depicts the topology of the power switching circuitry of a motor controller which may be employed in the electric drive train architecture according to FIG. 3f. The inputs $i_{a3}$ and $i_{b3}$ of the motor controller Motc3 are connected to the electric generator G21. And the outputs $O_{a3}$, $O_{b3}$, $O_{c3}$ of the motor controller Motc3 are each connected to one of the three phases of the stacked electric motor element Ee3. Multiphase solutions (6 phases or more are also possible in order to improve system reliability). By the same token, the inputs $i_{a4}$ and $i_{b4}$ of the motor controller Motc4 are connected to the electric generator G22; the outputs $O_{a4}$, $O_{b4}$, $O_{c4}$ of the motor controller Motc4 are each connected to one of the three phases of stacked the electric motor element Ee4.

FIG. 3f depicts a topology where a four-stack drive GEMD is used; however, an electric motor assembly GEMD using different number of stacks are possible. Moreover, two electric generators G11, G12 are used to supply DC to the top power branches b1 and b2. Only one electric generator G11 or G12 can be used to feed the top power branches b1 and b2. Or both electric generators G11 and G12 can be used to feed a single top power branch b1 or b2. Or, a single electric generator G11 or G12 can be used to feed a single top power branch b1 or b2. Also, two electric generators G21, G22 are used to supply DC to the bottom power branches b3 and b4. Only one electric generator G21 or G22 can be used to feed the bottom power branches b3 and b4. Or both electric generators G21 and G22 can be used to feed a single bottom power branch b3 or b4. Or, a single electric generator G21 or G22 can be used to feed a single bottom power branch b3 or b4.

Figure 3G:
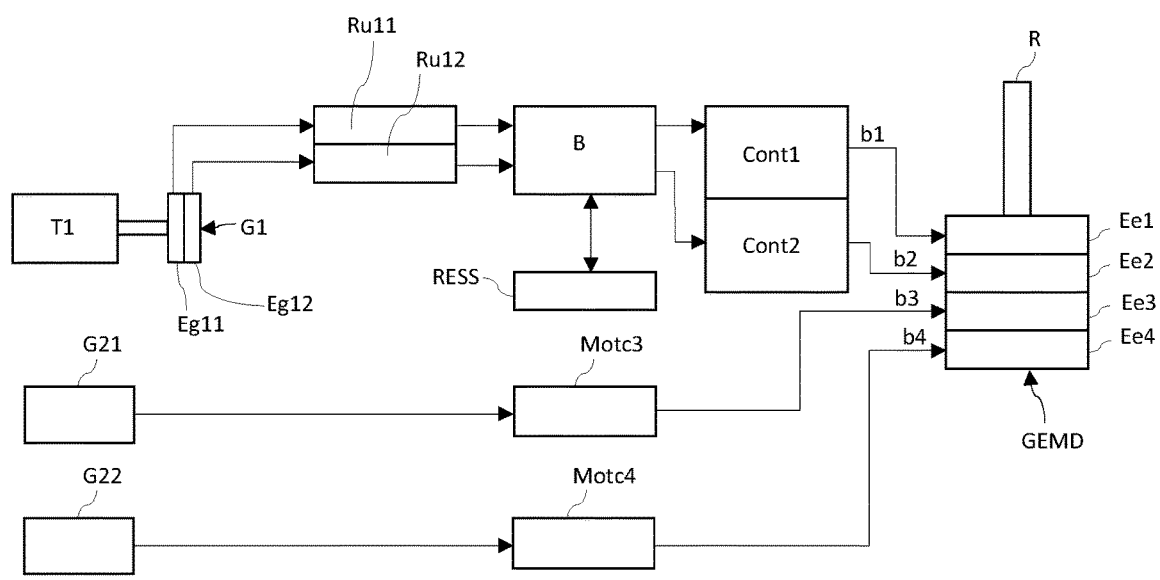
FIG. 3g is a block diagram depicting a series-hybrid electric drive train architecture according to the invention in accordance with yet another illustrative embodiment.

Eighth Embodiment—FIG. 3g

FIG. 3g presents a series-hybrid electric drive train architecture in accordance with yet another illustrative embodiment of the invention. This disclosed architecture uses the same multi-stack electric motor assembly GEMD as depicted in FIG. 2, FIG. 3, FIG. 3a, FIG. 3b, FIG. 3c, FIG. 3d, FIG. 3e and FIG. 3f and provides the same benefits and advantages of those depicted above in reference to said FIG. 3, FIG. 3a, FIG. 3b, FIG. 3c, FIG. 3d, FIG. 3e and FIG. 3f.

An engine T1 and two DC generators G21, G22 are used to feed the four-stack drive GEMD, via the two completely independent pairs of power branches, respectively b1-b2 and b3-b4. The engine T1 drives the electric generator assembly G1. The DC generators G21 and G22 are similar to those describe above in reference to the seventh embodiment. Moreover, the engine T1 and the electric generator assembly G1 are similar to those described above in reference to the third embodiment. The electric generator assembly G1, and the electric generator G21, G22 are physically distinct.

The two-stack electric generator assembly G1 driven by the top engine T1 feeds the top power branches b1 and b2 and subsequently the stacked electric motor elements Ee1 and Ee2 of the electric motor assembly GEMD, via the conventional series-hybrid topology depicted above in reference to FIG. 3b.

The DC generators G21 and G22 feed the bottom power branches b3 and b4 and subsequently the stacked electric motor elements Ee3 and Ee4 of the electric motor assembly GEMD, via a topology comprising two independent motor controllers Motc3 and Motc4, as described above in reference to FIG. 3f and FIG. 9.

FIG. 3g depicts a topology where a four-stack drive GEMD is used; however, an electric motor assembly GEMD using different number of stacks is possible. Moreover, two electric generators G21, G22 are used to supply DC to the bottom power branches b3 and b4. Alternatively, a single electric generator G21 or G22 can be used to feed the bottom power branches b3 and b4. Or both electric generators G21 and G22 can be used to feed a single bottom power branch b3 or b4. Or, a single electric generator G21 or G22 can be used to feed a single bottom power branch b3 or b4. Conversely, a two-stack generator assembly G1 is driven by the top engine T1. However, an electric generator assembly G1 using different number of stacks is possible. A single top power branch b1 or b2 can feed a single electric motor element Ee1 or Ee2. A single electric generator element Eg11 or Eg12 can supply AC to a single top power branch b1 or b2. Or both stacked electric generator elements Eg11 and Eg12 can be used to feed a single top power branch b1 or b2.

While the invention has been described in conjunction with a limited number of embodiments, it will be appreciated by those skilled in the art that many alternatives, modifications and variations in light of the foregoing description are possible. Accordingly, the present invention is intended to embrace all such alternatives, modifications and variations as may fall within the spirit and scope of the invention as disclosed. In addition, in this disclosure, the terms "comprise", "comprising" "include" or "including" do not exclude other elements or steps, the terms "a" or "one" do not exclude a plural number, and the term "and/or" means either or both.

Any discussion of the prior art throughout the specification should in no way be considered as an admission that such prior art is widely known or forms part of common general knowledge in the field.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

This disclosure hereby incorporates by reference the complete disclosure of any patent or application from which it claims benefit or priority.

Glossary

AC: Alternating Current
APU: Auxiliary Power Unit
DA: Density Altitude
DC: Direct Current
EMP: Electromagnetic Pulse
ESP: Equivalent Shaft Power
FPE: Free Piston Engine
ICE: Internal combustion engine
IGBT: Insulated Gate Bipolar Transistor
MHD: Magnetohydrodynamic
MOSFET: Metal Oxide Semiconductor Field Effect Transistor
MTBF: Mean Time Before Failure
OEI: One Engine Inoperative
PA: Pressure Altitude
RESS: Rechargeable Energy Storage System
SFC: Specific Fuel Consumption
TBO: Time Before Overall

The invention claimed is:

1. An electric drive train including:
   one or more power sources collectively providing at least two power signals;
   an electric motor assembly including a plurality of separately powered electric motor elements, each motor element including a rotor and a stator;
   a power distribution system for distributing electric power from the one or more power sources to the electric motor assembly, the power distribution system including a plurality of independent power supply branches with each branch configured to transmit an independent power signal from the one or more power sources to at least one of the separately powered electric motor elements such that each electric motor element is independently supplied by a power supply branch,
   wherein a first subset of the power supply branches being configured to power a first subset of the electric motor elements with a first subset of the power signals, the first subset of power supply branches including one or more motor controllers for controlling the first subset of electric motor elements and a rechargeable energy storage system configured to store energy of the first subset of power signals as stored energy, and to selectively supply the stored energy to the one or more motor controllers to feed the first subset of electric motor elements; and
   wherein a second subset of the power supply branches being independent from the first subset of power supply branches and configured to power a second subset of the electric motor elements that are independent from the first subset of the electric motor elements with a second subset of the power signals, the second subset of the power supply branches including one or more matrix converters operating in an AC-AC mode or motor controllers to modify the second subset of the power signals to provide modified power signals to a second subset of the electric motor elements.

2. An electric drive train according to claim 1, wherein each electric motor element includes a dedicated power supply branch.

3. An electric drive train according to claim 1 wherein the one or more power sources includes a plurality of electric generator elements.

4. An electric drive train according to claim 1, wherein a subset of the electric generator elements are Direct Current (DC) power generators.

5. An electric drive train according to claim 1 wherein the rechargeable energy storage system is configured to supply power during times of dynamic power demands of a connected load.

6. An electric drive train according to claim 1 wherein the rechargeable energy storage system is configured to supply power during times of power supply failure.

7. An electric drive train according to claim 1, wherein the one or more matrix converters modify one or more of a frequency, shape, or duty cycle of the second subset of power signals.

8. An electric drive train according to claim 1 wherein at least one of the power sources supplies power to at least one power supply branch of both the first and second subsets.

9. An electric drive train according to claim 1 wherein the plurality of electric motor elements are stacked together to define a stacked electric motor assembly.

10. An electric drive train according to claim 1, wherein the second subset of power branch distributes a majority of power from the one or more power sources to the electric motor elements when power demands fall within a predetermined power range.

11. An aircraft having a rotor or propeller shaft and an electric drive train according to claim 1, wherein the rotor or propeller shaft are driven by the plurality of stacked electric motor elements.

12. A method of feeding an electric drive train according to claim 1, the method including the steps of:
   (i) determining power demands of a load connected to the motor assembly; and
   (ii) selectively adjusting the distribution of power transmitted along first and second subsets of the power supply branches based on the power demands of the load.

13. An electric drive train according to claim 3 wherein each power supply branch is connected to one or more electric generator elements.

14. An electric drive train according to claim 3, wherein a first subset of the plurality of electric generator elements includes a first alternating current (AC) source.

15. An electric drive train according to claim 5 wherein the one or more power sources has a power production capacity and wherein the rechargeable energy storage system is configured to supply additional power during times when the dynamic power demands exceed the power production capacity of the one or more power sources.

16. An aircraft according to claim 11 wherein the first subset of power supply branches exclusively distributes power to the electric motor elements during any part of the flight domain and during power source failure of the aircraft.

17. An aircraft according to claim 11, wherein a distribution of power carried by each subset of the power supply branches is a function of a flight domain.

18. An electric drive train according to claim 14 wherein a subset of the plurality of electric generator elements are stacked together to define a stacked generator assembly and wherein the stacked generator assembly includes a second AC source.

19. A method of distributing power from one or more power sources to an electric motor assembly, the electric motor assembly including a plurality of separately powered stacked electric motor elements, each motor element including a rotor and a stator, the method including:
   (i) defining first and second independent power supply paths for respectively transmitting first and second power signals between the one or more power sources and the electric motor assembly,
      wherein the first power supply path includes one or more motor controllers feeding a first subset of the electric motor elements and a rechargeable energy storage system configured to store energy of the first power signal as stored energy, and to selectively supply the stored energy to the one or more motor controllers to feed at least one of electric motor elements; and
      wherein the second power supply path includes at least one matrix converter system operating in an AC-AC mode or motor controller configured to modify the second power signal to provide a modified second power signal to at least one of the electric motor elements; and
   (ii) selectively distributing electric power from the one or more power sources to the electric motor assembly via the first and second independent power supply paths.

20. A method according to claim 19 wherein step (ii) includes selectively adjusting the distribution of power transmitted along each path based on power demands of the electric motor assembly.

* * * * *